United States Patent
Rooney

(10) Patent No.: US 10,915,957 B2
(45) Date of Patent: *Feb. 9, 2021

(54) COVER-OCO FOR LEGGED ORDER

(71) Applicant: Trading Technologies International, Inc., Chicago, IL (US)

(72) Inventor: Patrick J. Rooney, St. Charles, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,493

(22) Filed: Dec. 5, 2019

(65) Prior Publication Data

US 2020/0115096 A1    Apr. 16, 2020

Related U.S. Application Data

(63) Continuation of application No. 15/962,516, filed on Apr. 25, 2018, now Pat. No. 10,540,718, which is a continuation of application No. 14/451,465, filed on Aug. 5, 2014, now Pat. No. 9,990,676, which is a continuation of application No. 13/915,189, filed on Jun. 11, 2013, now abandoned, which is a continuation of application No. 13/746,151, filed on Jan. 21, 2013, now Pat. No. 8,498,927, which is a continuation of application No. 12/637,536, filed on Dec. 14, 2009, now Pat. No. 8,386,368.

(51) Int. Cl.
| | |
|---|---|
| *G06Q 40/00* | (2012.01) |
| *G06Q 40/04* | (2012.01) |
| *B65D 5/20* | (2006.01) |
| *B65D 5/42* | (2006.01) |
| *B65D 6/18* | (2006.01) |
| *B65D 25/04* | (2006.01) |
| *B65D 5/36* | (2006.01) |
| *B65D 5/66* | (2006.01) |
| *B65D 71/56* | (2006.01) |

(52) U.S. Cl.
CPC ........... *G06Q 40/04* (2013.01); *B65D 5/2066* (2013.01); *B65D 5/4283* (2013.01); *B65D 7/26* (2013.01); *B65D 9/14* (2013.01); *B65D 11/1833* (2013.01); *B65D 25/04* (2013.01); *B65D 5/3635* (2013.01); *B65D 5/4266* (2013.01); *B65D 5/6658* (2013.01); *B65D 71/0014* (2013.01); *B65D 2543/00314* (2013.01)

(58) Field of Classification Search
CPC ...................................................... G06Q 40/04
USPC ................................................. 705/37, 36 R
See application file for complete search history.

(56) References Cited

U.S. PATENT DOCUMENTS

| | | |
|---|---|---|
| 6,772,132 B1 | 8/2004 | Kemp, II et al. |
| 6,938,011 B1 | 8/2005 | Kemp, II et al. |
| 7,127,424 B2 | 10/2006 | Kemp, II et al. |

(Continued)

*Primary Examiner* — Samica L Norman
(74) *Attorney, Agent, or Firm* — McDonnell Boehnen Hulbert & Berghoff LLP

(57) ABSTRACT

A position associated with a synthetic spread order may be managed where a status of a synthetic spread order is identified as legged. The synthetic spread order may have at least one child hedge order pending at an electronic exchange and in response, a bracket order is submitted to an electronic exchange for the tradeable object associated with a filled leg of the synthetic spread. In response to execution of the bracket order, the child hedge order may be cancelled.

11 Claims, 13 Drawing Sheets

(56) References Cited

U.S. PATENT DOCUMENTS

| | | |
|---|---|---|
| 7,228,289 B2 | 6/2007 | Brumfield et al. |
| 7,389,264 B2 | 6/2008 | Kemp, II et al. |
| 7,389,268 B1 | 6/2008 | Kemp, II et al. |
| 7,424,450 B2 | 9/2008 | Kemp, II et al. |
| 7,437,325 B2 | 10/2008 | Kemp, II et al. |
| 7,788,167 B1 | 8/2010 | Deitz et al. |
| 7,813,995 B2 | 10/2010 | Burns et al. |
| 8,290,851 B2 | 10/2012 | Deitz et al. |
| 8,386,364 B2 | 2/2013 | Sibley et al. |
| 8,386,368 B2 | 2/2013 | Rooney |
| 8,498,927 B2 | 7/2013 | Rooney |
| 8,527,390 B1 | 9/2013 | Mintz et al. |
| 8,566,219 B2 | 10/2013 | Mintz |
| 9,990,676 B2 | 6/2018 | Rooney |
| 2005/0154668 A1 | 7/2005 | Burns et al. |
| 2008/0077521 A1* | 3/2008 | Sibley et al. ............. 705/37 |
| 2010/0017321 A1* | 1/2010 | Callaway et al. ......... 705/37 |
| 2010/0145874 A1* | 6/2010 | Janowski ............. 705/36 R |
| 2010/0250423 A1 | 9/2010 | Mintz |
| 2010/0293088 A1 | 11/2010 | Deitz et al. |
| 2011/0040668 A1* | 2/2011 | Lee et al. ................. 705/37 |
| 2011/0040669 A1 | 2/2011 | Lee et al. |
| 2011/0145124 A1 | 6/2011 | Rooney |
| 2013/0138550 A1 | 5/2013 | Rooney |
| 2014/0143113 A1 | 5/2014 | Rooney |
| 2015/0178837 A1 | 6/2015 | Rooney |
| 2018/0240189 A1 | 8/2018 | Rooney |

\* cited by examiner

| Spreader | | | FJun10 | | | F Dec10 | | |
|---|---|---|---|---|---|---|---|---|
| | 718 < | 712 33 | 726 | 720 < | 714 2 | 728 | 722 < | 716 |
| -0.030 | 0.020 | | <Default> | 1.06 | | <Default> | 1.09 | |
| | 0.015 | | 218 | 1.05 | | 8 | 1.08 | |
| | 0.010 | | | 1.04 | | | 1.07 | |
| | 0.005 | | S 0 W 2 738 | 1.03 | | | 1.06 | |
| 0 | 0.000 | | 0 | 1.02 | 100 | 0 | 1.05 740 | 4 |
| | -0.005 | | S 0 W 100 738 | 1.01 | | S 0 W 4 738 | 1.04 | |
| | -0.010 | | 0 | 1.00 | | 0 | 1.03 | |
| 1 | -0.015 | | 1 | 0.99 | | 1 | 1.02 | |
| 5 | -0.020 | | 5 | 0.98 | 17 | 5 | 1.01 | 102 |
| 10 20 | -0.025 | 2 | 10 20 | 0.97 740 | | 10 20 | 1.00 | |
| 50 100 | -0.030 736 | | 50 100 | 0.96 B 0 W 6 738 | | 50 100 | 194 0.99 S 0 W 100 738 | |
| CLR | -0.035 | | CLR | 0.95 | | CLR | 100 0.98 | |
| 0 | -0.040 | | 0 | 0.94 100 | | 0 | 0.97 | |
| | -0.045 | | SL SM | 0.93 100 | | SL SM | 0.96 | |
| | -0.050 | | Limit | 0.92 | | Limit | 0.95 | |
| Del All | -0.055 | | Del All | 0.91 | | Del All | 0.94 | |
| Delete | -0.060 | | Del 3 | 0.90 | | Del 204 | 0.93 | |
| Delete 1 | -0.065 | | Del 102 | 0.89 | | Del 294 | 0.92 | |
| | > 730 | | | > 732 | | | > 734 | |

Figure 7

700 Spreader — 09:38:46

| | 718 | |
|---|---|---|
| | < | |
| | 0.020 | 33 |
| | 0.015 | |
| | 0.010 | |
| | 0.005 | |
| | 0.000 | |
| | -0.005 | |
| | -0.010 | |
| | -0.015 | |
| | -0.020 | |
| -0.030 | -0.025 | |
| | -0.030 | 5 |
| | -0.035 | |
| 0 | -0.040 | |
| 1 5 | -0.045 | |
| 10 20 | -0.050 | |
| 50 100 | -0.055 | |
| CLR | -0.060 | |
| 0 | -0.065 | |
| B 0 W1 L1  736 | 2 | |
| Del All | | |
| Delete | | |
| Delete 1 | | |

702 FJun10 — 09:38:46

| | 720 | |
|---|---|---|
| | < | |
| | 1.06 | 2 |
| S 0 W 2  738 | 1.05 | |
| | 1.04 | |
| S 0 W 100  738 | 1.03 | |
| | 1.02 | 100 |
| | 1.01 | |
| | 1.00 | |
| 218 | 0.99 | |
| | 0.98 | 17 |
| | B 3 W 3  738  0.97 | |
| 0 | 0.96 | |
| 0 | 0.95 | |
| 1 5 | 0.94 | 100 |
| 10 20 | 0.93 | 100 |
| 50 100 | 0.92 | |
| CLR | 0.91 | |
| 0 | 0.90 | |
| SL SM | 0.89 | |
| Limit | | |
| Del All | | |
| Del 3 | | |
| Del 102 | | |

704 F Dec10 — 09:38:46

| | 722 | |
|---|---|---|
| | < | |
| | 1.09 | |
| | 1.08 | |
| | 1.07 | |
| | 1.06 | |
| | 1.05 | 6 |
| S 0 W 2  738 | 1.04 | |
| | 1.03 | |
| | 1.02 | 100 |
| | 1.01 | |
| B 1 W 100  738 | 1.00 | 15 |
| <Default> | 0.99 | |
| 8 | 0.98 | |
| 0 | 0.97 | |
| 0 | 0.96 | |
| 1 5 | 0.95 | |
| 10 20 | 0.94 | |
| 50 100 | 0.93 | |
| CLR | 0.92 | |
| 0 | | 6 |
| SL SM | | |
| Limit | | |
| Del All | | |
| Del 204 | | |
| Del 294 | | |

Figure 8

ORDER BOOK

Change: ◀ 0 ▶ [Clear]

Cancel/Replace: ◀ 0 ▶ [Inq] [GTD] [Delete] ORDER Cust [▼] ☐ Confirm [Delete All] [Hold] [Submit]

Del All Bids | Del All Asks

| | Exch | Status | B/S | Qty | Product | Contract | Price | Stop Prc | Type | TIF | Rstr | Exec Qty | Work Qty | Account # | Order No. |
|---|---|---|---|---|---|---|---|---|---|---|---|---|---|---|---|
| 1 | SIM | Working | S | 5 | Autospread | ES Spread | 104 | | Limit | GTD | | 0 | 5 | 1234567 | 9876543 |
| 2 | CME | Working | S | 2 | ES | DEC09 | 75 | | Limit | GTD | | 0 | 5 | 1234567 | 8765432 |
| 3 | CME | Working | S | 3 | ES | DEC09 | 100 | | Limit | GTD | | 0 | 5 | 1234567 | 7654321 |
| | | | | | | | | | | | | | | | |

Figure 10

Fill Window

| Time | Exch | B/S | Qty | Price | Product | Contract | Account # | Exch Time | Order No. | Exch Date | Order Time |
|---|---|---|---|---|---|---|---|---|---|---|---|
| 1 | 8:26:51 | SIM | S | 5 | 104 | Autospread | ES Spread | 1234567 | 8:26:51 | 9876543 | MM.DD.YY | 8:10:11 |
| 2 | 8:28:22 | CME | S | 2 | 75 | ES | DEC09 | 1234567 | 8:28:22 | 8765432 | MM.DD.YY | 8:10:23 |
| 3 | | CME | S | 3 | 100 | ES | DEC09 | 1234567 | 8:28:31 | 7654321 | MM.DD.YY | 8:10:44 |

| Exchange | Product | Contract | BuyQty | SellQty | NetPos | P/L (Last) | AvgBuy | AvgSell | Open P/L |
|---|---|---|---|---|---|---|---|---|---|
| CME | ES | | 10 | 10 | 0 | 1000 | | | |
| SIM | Autospread | ES Spread | 5 | 5 | 0 | 400 | | | |
| | | | 5 | 5 | 0 | 600 | | | |

Figure 11

| | 1 | 5 | 10 | | | | | | |
|---|---|---|---|---|---|---|---|---|---|
| | 100 | 500 | | ◀ | 0 | ▶ | ◀ | 0 | ▶ |
| | Clear | | | | | | | | |

Order
GTD | Limit | None ▶ | Open ▶ | A1 ▶
<Default> | ▶ | | CLEAR
☐ Hold
☐ Confirm

| BUY | SELL | | | | | | | | | | |
|---|---|---|---|---|---|---|---|---|---|---|---|
| Contract | WrkBuy | BidQ | BidPrc | AskPrc | AskQ | WrkSells | NetPos | FF | NetPos | LastPrc | LastQ | Total | Chng |
| Autospread | 2 | 2 | -0.030 | 0.020 | 33 | | | | | -0.030 | 5 | 10 | |

Spread Configuration — 1300

Configure This Spread

Autospreader: TTSIM-D FGBL Sep02 vs. TTSIM-D FGBL Sep02

Spread Name:

Slop
- Inside:
- Outside:

Leg Color ID: [▶]

Base Spread On:
- ● Implied Spread Prices
- ○ Net Change

[OK] [CANCEL]

| Leg | LEG A<br>F JUN10 ▶ | LEG B<br>F DEC10 ▶ |
|---|---|---|
| Customer Account | <Default> ▶ | <Default> ▶ |
| Active Quoting | ☒ | ☒ |
| Adjust for Market Depth | ☒ | ☒ |
| Offset with | Limit Orders ▶ | Limit Orders ▶ |
| Payup Ticks | 0 | 0 |
| Spread Ratio | 1 | -1 |
| Cover Bracket | 1 | 3 |
| OCO Bracket | 2 | 4 |
| Price Reasonability Check on leg | ☒ | ☒ |

COVER-OCO FOR LEGGED ORDER

CROSS REFERENCE TO RELATED APPLICATIONS

This application is a continuation of U.S. patent application Ser. No. 15/962,516, now U.S. Pat. No. 10,540,718, filed Apr. 25, 2018, which is a continuation of U.S. patent application Ser. No. 14/451,465, filed Aug. 5, 2014, now U.S. Pat. No. 9,990,676, which is a continuation of U.S. patent application Ser. No. 13/915,189, filed Jun. 11, 2013, which is a continuation of U.S. patent application Ser. No. 13/746,151, filed Jan. 21, 2013, now U.S. Pat. No. 8,498,927, which is a continuation of U.S. patent application Ser. No. 12/637,536, filed Dec. 14, 2009, now U.S. Pat. No. 8,386,368, entitled "Cover-OCO for Legged Order," the contents of each of which are fully incorporated herein by reference for all purposes.

TECHNICAL FIELD

The present invention relates generally to electronic trading, and particularly to tracking and managing orders for synthetic spread trading.

BACKGROUND

Electronic trading generally occurs across a network of computers, servers, gateways, processors and other related devices. In general, a host exchange (also referred to as an electronic exchange, or simply exchange) generally having one or more centralized computers, forms an electronic heart of an electronic trading system. The centralized computers are configured to receive and process orders for one or more tradeable objects generally received from traders and/or users via the electronic trading system, other electronic trading systems and/or other host exchanges.

To process the orders, the host exchange maintains an order book for a tradeable object and matches contra orders for the tradeable object according to a matching algorithm. The order book records unexecuted, pending, orders for the tradeable object. The orders in the order book are collectively referred to as the inside market and market depth for the tradeable object.

The host exchange may manage and update a database for data for tradeable objects traded, listed, and/or exchanged at the host exchange and/or other host exchanges and may supply or broadcast the data regarding tradeable objects via a data feed. The data is generally supplied or broadcast real-time, or substantially real-time, from the host exchange. The information may be supplied in the form of streaming data or other suitable form for supplying data via a data feed. The information generally identifies the order book for a tradeable object, and includes information identifying order pricing and information for orders that have been filled (otherwise known as matched or executed).

Users of the electronic trading system (also referred to as traders) connect to the host exchange via a client device to receive information from the host exchange via the data feed. The client device also may receive data from one or more host exchanges via one or more data feeds.

Using the client device, the trader may visualize the information and send orders to the host exchange. Similarly, the client device may automatically, without human intervention, send orders to one or more host exchanges. The orders may be sent to the host exchange based on the data received from the host exchange, based on data received from another host exchange, and/or based on events and/or conditions identified from data or information received from other sources.

The host exchange receives and records the order in a database with like orders. For example, all orders for a tradeable object are stored to form a database for the orders for the tradeable object. The orders for the tradeable object at the host exchange form the order book. The orders are generally arranged according to price and sequence in which the order was received, where orders with the same price that have not been executed, but are pending a match from a contra order are organized together in the sequence that the order was received at the host exchange.

The orders pending a match at the host exchange are generally matched according to the match algorithm for the exchange. Common match algorithms include a first-in, first-out (FIFO), pro-rata, and hybrid FIFO and pro-rata match algorithms. In a FIFO match algorithm, orders at a price level are matched based on the time or sequence that the order was received at the host exchange, where orders are generally filled with priority given to the first order entered at the price, then the second (next) order entered, and so forth. In a pro-rata algorithm at a price level are matched based on the size of the order relative to other orders at the same price. Hybrid systems match orders in a combination of FIFO and pro-rata matching. Other variations of matching algorithms may be used as well.

A trading strategy may be straightforward, such as trading an individual tradeable object, or may be complex, such as trading of multiple tradeable objects, also referred to as spread trading. In general, spread trading includes simultaneous, or substantially simultaneous, buying and/or selling of one, two, or more tradeable objects. The tradeable objects of a spread are commonly known as outright markets or legs of the spread.

A purpose of spread trading is to provide for trading of the movement of the market for the tradeable object(s). A spread often provides another measure for hedging risk. The spread allows the trader to capitalize on changes or movements in the relationships between the tradeable object(s) of the spread.

A spread may be defined by the host exchange (also referred to as exchange-defined spread) or may be a synthetic or user-defined spread. An exchange defined spread is a spread that is listed and priced by a host exchange, where the host exchange matches orders for the spread against contra orders for the spread in an order book for the spread. Synthetic spreads refer to a spread that is defined by the trader. In a synthetic spread, the trader identifies each leg of a spread and administers orders for each leg to carry out a trading strategy for the spread.

A spread may be inter-commodity or intra-commodity. Types of spreads include butterfly spreads, bear spreads, bull spreads, calendar spreads, crack spreads, horizontal spreads, vertical spreads, basis, bundles, packs, strips, straddles, strangles, ratio spreads and combinations thereof. For example, a vertical spread may be a bear spread with a sale of a tradeable object such as a strike call, and a purchase of the tradeable object. A spread may include multiple types of tradeable objects, including, stocks, bonds, equities, commodities, future products, options, currencies, indexes, warrants, funds, repos and the like. For example, a butterfly spread may include future products having three underlying tradeable objects. A calendar spread is the simultaneous purchase of a futures product for a tradeable object and the sale of a futures product for the tradeable object for a different contract month.

A tradeable object includes a quantity of an item that can be traded, swapped of otherwise exchanged at a price. Tradeable objects include, but are not limited to, all types of traded events, goods, wares and/or financial product such as stocks, bonds, options, futures, commodities, currencies, repos, indexes, warrants, funds, derivatives thereof, collections thereof and combinations thereof. The tradeable object may be "real," such as products that are listed by an exchange for trading. A tradeable object may be "synthetic," such as a combination of real products created by the trader.

The client device may have a trading tool that is configured to automatically facilitate fast and accurate order entry and execute a trading strategy for the trader. The trading tool compiles the information from the host exchange, and facilitates sending orders to one or more host exchanges. For instance, using data from an exchange or some other reference condition, a trading tool calculates one or more order parameters, such as order price and order quantity, and automatically sends order having the parameters to the host exchange. The trading tool may also compile and arrange the information from one or more host exchanges in an intuitive manner to allow the trader to visualize the market and to make a fast and accurate determination for sending an order to the host exchange.

An example of a trading tool is Autospreader® of Trading Technologies International, Inc., Chicago, Ill. The Autospreader assists a trader in executing a spread trading strategy. Legs or outrights of a spread may be chosen, a relationship between legs defined, and a targeted spread price and quantity identified. The Autospreader may place an order for one of the legs based on an inside market for another leg of the spread to achieve (or attempt to achieve) the desired spread price. The Autospreader is also available as an add-on tool available with X_TRADER® Pro™, which is a trading application also available from Trading Technologies International, Inc. An example of an automatic spread trading tool is described in U.S. Pat. No. 7,437,325 titled "System and Method for Performing Automatic Spread Trading," the contents of which are fully incorporated by reference herein.

The spread trading tool may administer one or more orders for each leg of a spread to assist a trader to obtain a desired target for the spread. In an example, a trader may enter parameters of a spread and select a target price for a spread. An order in one of the legs is entered in one leg of the spread (e.g., a working order) based on at least an inside market for another leg of the spread (e.g. a hedge or offset order). As the inside market changes for the hedge, the working order may be re-priced to achieve the targeted price for the synthetic spread. The working order may be re-priced by submitting a change request to the host exchange for the tradeable object where the change request defines a new price for the working order. Additionally or in the alternative, a cancel/replace request could be submitted to the host exchange for the working order.

The working order may be filled in part or in whole according to a volume of a contra order matched against the working order. When the working order is filled completely, an order may be sent at the inside market of the hedge. When the working order is partially filled, an order may be sent at the inside market of the hedge according to the parameters set by the trader and/or the trading strategy of the trader. In addition, all or part of the hedge order also may be sent outside of the inside market for the hedge according to the parameters set by the trader and/or the trading strategy of the trader.

The hedge order, since at the inside market, may be filled immediately, at least in part. That is, if the price level for the inside market for the hedge order is unchanged from when the working order was received, the hedge order may be filled when it is received for the quantity available at the inside market. A portion of the hedge order that exceeds the quantity available at the inside market may not be filled. In addition, if the inside market has moved, the hedge order may not be filled, at least not immediately. The trader may be considered to be legged when at least a portion of the hedge order did not get filled.

Working orders may be placed in one or more legs of a spread. For example, a spread trading tool may place a working order in each leg of the synthetic spread. So that the trader does not get double-filled where each working order is filled and a corresponding hedge order for each filled working order is submitted, the spread trading tool may cancel all or some working orders upon detecting that one of the working orders was filled, at least partially. Accordingly, only the corresponding hedge order may be sent.

The working orders are often reported, tracked, and otherwise recorded according to the outright order itself and not as part of a spread trading strategy. In addition, fills of the working order and the hedge orders are also often tracked and otherwise recorded as a trade for the outright and not as a trade that is part of a spread trading strategy. Orders and synthetic spreads often exist in states that do not have an analog to states used for orders and fills for outright tradeable objects. For example, a synthetic spread may have a working order that is not completely filled, such as where a hedge order is not submitted. In addition, a synthetic spread may be considered legged where a hedge order is submitted but not filled, either completely or partially. Because the synthetic spreads are made up of component parts (i.e., working and hedge orders), other trading tools may be used to manipulate the component. In addition, because the synthetic spread is not managed as a whole order, other tools may not be useful to the trader to administer a spread trading strategy.

Accordingly, tools to improve assistance for a trader to employ synthetic spread trading strategies are desirable.

SUMMARY

Spread trading strategies may include methods, systems, and apparatuses for representing, managing, reporting, recording, administering, submitting, tracking and otherwise trading synthetic spreads, including orders for a synthetic spread, orders for components of a synthetic spread, and fills for the components of the spread and the spread itself.

In an embodiment for managing a position associated with a synthetic spread order, a status of a synthetic spread order is identified as legged such that the synthetic spread order has at least one child hedge order pending at an electronic exchange and in response, A bracket order is submitted to an electronic exchange for the tradeable object associated with a filled leg of the synthetic spread. In response to execution of the bracket order, the child hedge order is cancelled.

While the example embodiments are described herein with reference to illustrative embodiments for particular applications, it should be understood that the example embodiments are not limited thereto. For instance, it should be understood that the system and methods of the present embodiments can be applied by other software applications outside of the trading environment. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

BRIEF DESCRIPTION OF THE FIGURES

Synthetic spread trading is described and illustrated via exemplary embodiments, which are not limited by the accompanying figures. Figures having like reference numerals indicate similar elements.

FIG. 7 illustrates a spread window display for a synthetic spread and constituent legs of the synthetic spread.

FIG. 8 shows a spread window display for a synthetic spread window after child quoting and child hedge orders have been filled.

FIG. 10 illustrates an example of an order book tool 1000 for a synthetic spread.

FIG. 11 illustrates an example of an order book tool 1100 for a synthetic spread.

FIG. 12 illustrates an example of a market grid or market window tool 1200 for a synthetic spread.

FIG. 13 illustrates an example of a Spread configuration window.

DETAILED DESCRIPTION

I. Electronic Trading Environments

Figure 1:
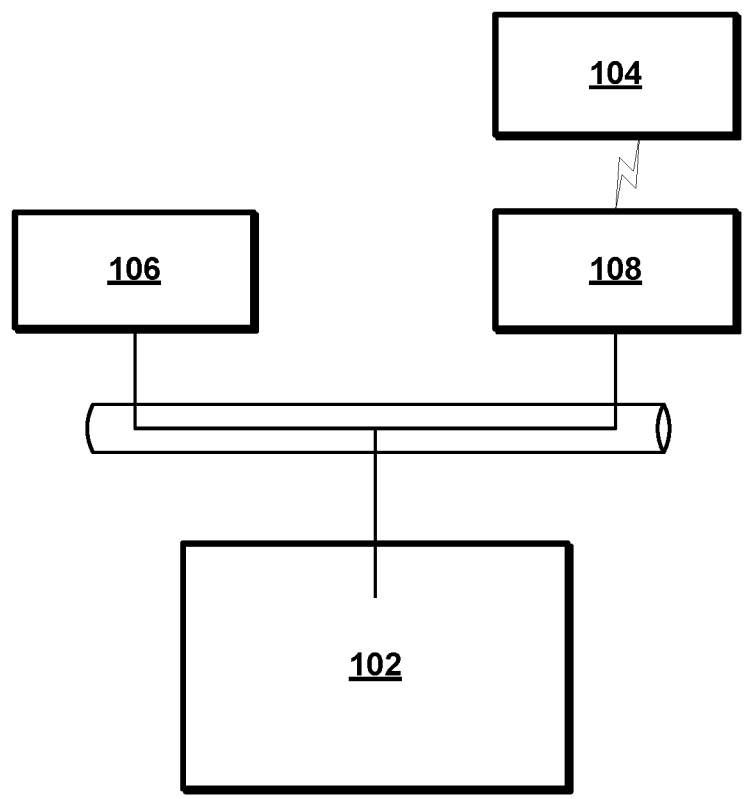
FIG. 1 illustrates a block diagram for an exemplary electronic trading environment in which aspects of spread trading may be employed.

FIG. 1 illustrates an exemplary electronic trading environment in which the embodiments for spread trading strategies may be employed. The electronic trading environment includes a client device 102, a gateway 106, an electronic exchange 105, and a router 108. The client device is coupled to the electronic exchange 104 through one or more devices such as the gateway 106 for communication of information. Router 108 is configured to route messages between the gateway 106 and the electronic exchange 104.

The electronic exchange 104 may list one or more tradeable objects for trading. The electronic exchange 104 includes at least one processor or central computer. The electronic exchange is configured to receive orders from client devices 102 and match the orders against contra orders. An order received from the client device 102 that is not immediately matched may be stored and arranged in an order book for a tradeable object. The orders are matched according to a match algorithm for the tradeable object of the order. While not shown in FIG. 1, the trading system may include other devices for the client site, such as middleware and security measures, including firewalls, hubs, security managers, and the like.

The electronic exchange 104 may also distribute information related to orders received at the electronic exchange 104, as well as orders matched at the electronic exchange 104. The information may be distributed or broadcast to one or more subscribing client devices 102. The information may include data representing an inside market, including the lowest sell price (best ask) and the highest buy price (best bid) at a particular point in time. The information also may include market depth, which may include quantities of a tradeable object available at the inside market as well as quantities of the tradeable object available at prices away or outside of the inside market, to the extent that such quantities are available.

The quantity available at a price level may be provided in aggregate sums. The electronic exchange 104 may provide a total buy quantity and a total sell quantity available in the market at a price level in its data feed. The extent of the market depth available to a trader usually depends on the exchange. An amount of market depth provided also may be limited and not include all quantities of a tradeable object available. For instance, some electronic exchanges 104 provide market depth for all (or most) price levels, while some electronic exchanges 104 provide a market depth only for quantities associated with, at, or near the inside market, while others provide no market depth. The electronic exchange 104 may provide other types of information such as the last traded price (LTP), the last traded quantity (LTQ), and order fill information. Information related to order fills and execution may be referred to as market data.

The client device 102 may be one or more mainframe, desktop, notebook, tablet PC, handheld, personal digital assistant, smartphone, server, gateway, combination thereof, or other computing device having one or more processors or central processing units. The client device 102 also may include one or more memory or data storage devices, an input interface for receiving data from a communications network, an input interface for receiving input signals from one or more input devices, such as a keyboard, a trackball, pen device, microphone, gazing detection device, a two or three-button mouse for click-based trading and/or other device for configured to receive input from a user, and an output interface for communications with at least one output device (e.g., a monitor). A system bus, or an equivalent, may provide communications. The client device 102 may be one or more devices such as multiple work stations or a network of devices.

Memory may include a computer readable medium, including any medium that participates in providing instructions to a processor. A computer readable medium may take forms, including non-volatile media, volatile media and transmission media. Non-volatile media may include optical or magnetic disks, such as storage devices. Volatile media may include dynamic memory, such as main memory, random access memory ("RAM"), dynamic random access memory ("DRAM") and the like. Common forms of computer readable media also include floppy disks, flexible disks, hard disks, magnetic tape, punch cards, CD-ROM, a RAM, a PROM, an EPROM, a FLASH-EPROM, and any other memory chip or cartridge, or medium from which a computer can read. The processor may have sufficient processing capability for available market information. In an exemplary embodiment, the client device includes at least one Pentium® class processor and may operate using one or more of a Windows® or MAC OS operating system.

The gateway 106 also can also be any type of computing device, such as a personal computer or faster computing device. The gateway 106 may have one or more central processing units, memory or data storage devices, input interfaces for receiving data from a communications network, input interfaces for receiving input signals from one or more input devices, such as a keyboard, a trackball, pen device, microphone, gazing detection device, a two or three-button mouse for click-based trading and/or other device for configured to receive input from a user, and an output interface for communications with at least one output device (e.g., a monitor). The gateway 106 may have a Pentium-class processor and may operate under one or more Windows (server or workstation), MAC OS operating systems, or other operating system. The gateway 106 also may have access to an internal or external database.

The devices herein may be hardware objects, software, or a combination of hardware and software. The devices may use integrated circuit development technologies to implement functions and features described herein and may communicate using electrical, optical, radio frequency or other appropriate signals.

The client device 102 may execute one or more applications. The application may be executed using an operating system of the client device 102. The gateway 106 may also execute one or more gateway applications. The gateway applications may be executed under the control of an operating system of the gateway 106. In addition or alternatively, the one or more application programs of the client device 102 may be executed at or performed by the gateway 106, and one or more gateway applications may be performed by the client device 102.

One skilled in the art will understand that various electronic trading environments having the same, additional or alternative features as described with respect to FIG. 1. Accordingly, the exemplary embodiment of FIG. 1 represents electronic trading environments having features, such computer programs and/or systems that do not necessarily relate to electronic trading (e.g., operating systems, gaming systems, and/or other software applications). One skilled in the art of electronic trading systems would be able to implement a suitable electronic trading environment. For the purposes of illustration, some example configurations are provided to illustrate where the features may be physically located and how they may be coupled to implement an electronic trading system. These illustrations are not limiting.

According to one example illustration, the gateway device may be located at a client site or integral with the client device 102 and which may be remote from the electronic exchange 104. According to this instance, the client device 102, the gateway 106, and the router 108 may communicate over a local area network, and the router 108 may communicate with the electronic exchange 104 over a T1, T3, ISDN, or some other high speed connection.

In another example illustration, the client device, or portion thereof, may be located proximate to a processor of the electronic exchange 104. For example, a server carrying out or executing one or more features of the invention may be co-located with a processor of the electronic exchange 104 (for example, in the building of or associated with the exchange). Accordingly, the client device 102, the gateway 106, and the router 108 may also communicate over a local area network, and the router may communicate with the electronic exchange 104 through another connection means besides a T1, T3, or ISDN.

In another example illustration, the gateway may be housed at, or near, a corresponding electronic exchange 104. According to this instance, the client device may communicate with the gateway over a wide area network or through the use of a T1, T3, ISDN, or some other high speed connection.

In another example, the gateway 106 may be located remote from the client device 102 and remote from the electronic exchange 104. Such an embodiment may be useful in systems that include interconnection of multiple trading networks. Thus, in an electronic trading network might having gateway access to an electronic exchange 104, other electronic trading networks may communicate with the trading network through a T1, T3, ISDN, or some other high speed connection.

Figure 2:
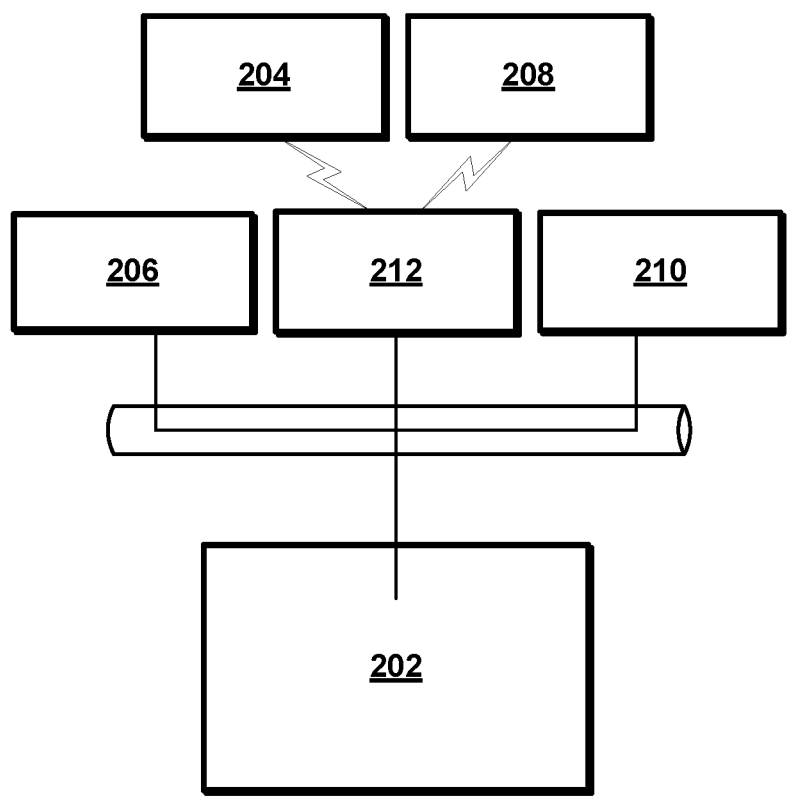
FIG. 2 illustrates a block diagram for another exemplary spread trading strategies at multiple electronic exchanges.

FIG. 2 illustrates exemplary electronic trading environment in which embodiments for spread trading strategies may be employed. The electronic trading environment includes a client device 202 coupled with electronic exchanges 204 and 208. Electronic exchange 204 may be accessed through gateway 206 and electronic exchange 208 may be accessed through gateway 210. Alternatively or in addition, electronic exchanges 204 and 208 may be accessed through a combined gateway that provides access to multiple electronic exchanges.

Router 212 routes data between gateways 206 and 210 and electronic exchanges 204 and 208. Other devices such as middleware and security measures like firewalls, hubs, security managers, and so on, may also be included in the electronic trading environment. In addition, more electronic exchanges may be included.

A trader may trade tradeable objects listed at, matched at, and/or cleared at a single and/or multiple electronic exchanges 204 and 208. Orders may be sent to one or both electronic exchanges 204 and 208 and market information may be received from one or both electronic exchanges 204 and 208. For example, market information may be received at client device 202 from both electronic exchanges 204 and 208 and viewable through a common visual display of client device 202. As such, price and quantity information of tradeable objects at the electronic exchanges 204 and 208 may be view simultaneously and proximately.

In another example, a trader can spread trade and/or arbitrage trade tradeable objects listed at multiple electronic exchanges 204 and 208. That is, a trader may trade a tradeable object at electronic exchange 204 and trade another tradeable object at electronic exchange 208.

Embodiments for synthetic spread trading may include additional exchanges, gateways, client devices, routers, or other computers serving various functions like message handling and security. In additional, several or multiple networks, like networks shown in FIG. 1 or FIG. 2, may be linked together to communicatively access one or more electronic exchanges.

Similar to client device 102 of FIG. 1, client device 202 may be any computing device such as a personal computer, workstation, desktop, laptop, handheld device, smartphone, personal digital assistant, tablet PC, server, gateway, combinations thereof and other computing devices having one or more processors or central processing units. The client device 202 may be one or more devices such as multiple work stations or a network of devices. The client device 202 also may include one or more memory or data storage devices, an input interface for receiving data from a communications network, an input interface for receiving input signals from one or more input devices, such as a keyboard, a trackball, pen device, microphone, gazing detection device, a two or three-button mouse for click-based trading and/or other device for configured to receive input from a user, and an output interface for communications with at least one output device (e.g., a monitor). A system bus, or an equivalent, may provide communications. Memory may include any computer readable medium and the processor has sufficient processing power to handle and process various types of market information. In an exemplary embodiment, the client device includes at least one Pentium® microprocessor and operates under a Windows operating system.

The market information or other data, such as news, charting data, and/or order-related information from an exchange or other data source may be displayed on the output device of the client device 202, such as a visual display device. In addition or alternatively, the information could be provided via the client device, at least in part, via other means such as sound. The output device can be any display device, audio device, or combination thereof suitable for presenting information. For example, the display device may be a CRT-based video display, an LCD-based or a gas plasma-based flat-panel display, a display that shows three-dimensional images, or some other type of display. The display device may also have audio devices, and/or Braille output devices. The display device may allow interaction between the user and the information. Accordingly, the display device may include a data input device as well.

The user of the client device, (e.g., a trader) may send orders for one or more tradeable objects to an exchange via the client device. An order may include instructions or messages to place a new order, cancel an existing order, change an existing order, query an exchange about orders or order book for one or more tradeable objects, test a connection to, or communication with, an exchange, combinations thereof and the like. The trader may view the information provided by the exchange, and in response send an order appropriate order.

The trader may provide various commands or signals into a client device 202 via one or more input devices of the client device 202. For example, a trader may input commands to the client device 202 by typing into a keyboard, manipulation of a mouse or pointing device, viewing a portion of a display device, touching an area of a display device or area controlled by a display device, or inputting commands or signals through some other input device. A trader may use a mouse device to identify an area of an output device, click a mouse button to initiate an order for a quantity of a tradeable object and cause an order to be sent to one of the electronic exchanges 204 and 208. That is, the client device 202 preferably generates transaction information in response to the user input or some other trigger affected by the user input. There are many different types of messages and/or order types that can be submitted, all of which may be considered various types of transaction information. The transaction information may be sent from the client device 202 to one or more host exchanges 208 and 208 over one or more communication channels and/or networks.

In an exemplary embodiment, software on client device 202 creates interactive trading screens on associated display devices. The display devices may enable the trader to, among other things, enter and execute orders, obtain market quotes, and monitor positions. A range and quality of features available on the display device may vary according to the client device and/or software of the client device. In addition to or alternative to being interactive, the client device could automate a trading application.

While exemplary embodiments may be implemented relative to various environments and applications, exemplary embodiments are described in relation to a trading application and a trading screen. One skilled in the art will understand that details of the output device are not necessary for an understanding of the present invention. One type of trading tool that may be run by the client device and output device is provided by a commercially available trading application referred to as X_TRADER® from Trading Technologies International, Inc. of Chicago, Ill. X_TRADER also provides an electronic trading interface, referred to as MD Trader®, in which indicators for working, or pending, orders are displayed in association with a static price axis or scale.

The indicators may identify bid and/or ask quantities of orders at corresponding or associated prices. The indicators may be anything that illustrates an order, such as one or more numbers, an icon, character, emblem, logo, symbol, box, chart, picture, pointer or other graphical display indicating an order. Portions of the X_TRADER and the MD Trader style display are described in U.S. Pat. No. 6,772,132 for a "Click Based Trading With Intuitive Grid Display of Market Depth," U.S. Pat. No. 6,938,011 for a "Click Based Trading with Market Depth Display" U.S. Pat. No. 7,127,424 for a "Click Based Trading With Intuitive Grid Display of Market Depth and Price Consolidation," U.S. Pat. No. 7,389,268 for "Trading Tools For Electronic Trading," and U.S. Pat. No. 7,228,289 for "A System and Method for Trading and Displaying Market Information in an Electronic Trading Environment," the contents of each are incorporated fully herein by reference. In addition or alternatively, other trading tools may be used to view market data and/or to place order. Additionally, the preferred embodiments are not limited to any particular product that performs translation, storage, and display function.

II. Spread Trading Strategies

In general, a trading strategy involving multiple tradeable objects involves a relationship between the multiple tradeable objects. Each of the tradeable objects of the trading strategy may be referred to as a leg or outright. One type of trading strategy involving multiple tradeable objects is referred to as a spread.

A spread may be considered to be bought or sold. A spread that is bought defines which leg of the spread is bought and/or sold. Similarly, a spread that is sold defines which leg is sold and/or bought. A spread may be bought where a first tradeable object for leg A is bought, and a second tradeable object for leg B is sold. Selling the spread may include performing opposite actions for each leg.

A spread may also identify, or may be based on, a spread ratio between legs of the spread, also be referred to as an order size for the leg. The spread ratio indicates the quantity of each leg in relation to other legs of the spread. For example, a spread having legs A and B may define buying 2 units of leg A and selling 3 units of leg B.

The spread may also have a nomenclature for a sign for the spread. The sign may indicate whether the leg is to be bought (e.g., the spread ratio is positive) or sold (e.g., the spread ratio is negative) when buying the trading strategy. Accordingly, the spread having legs A and B where 2 units of leg A are bought and 3 units of leg B are sold, the ratio of leg A would be "2" and the ratio of leg B would be "−3."

Additionally or alternatively, a spread ratio may be implied or implicit. That is, the spread ratio for a leg of a trading strategy may not be explicitly specified, but rather implied or defaulted to be "1" or "−1."

A spread also may include a multiplier for each leg. The multiplier defines a price relationship. That is, the multiplier may adjust a price of a leg for determining the price of the spread. The multiplier may be the same as the spread ratio. In the example above, the multiplier associated with leg A may be "2" and the multiplier associated with leg B may be "−3," both of which match the corresponding spread ratio for the legs. The multiplier associated with one or more legs may be different than the corresponding spread ratios for those legs. For example, the values for the multipliers may be selected to convert the prices for the legs into a common currency.

For simplicity, the exemplary embodiments described herein include a spread ratio and multipliers for each leg being the same, unless otherwise indicated. In addition, the description of the exemplary embodiments assumes that the signs for the spread ratio and the multipliers for a particular leg are the same and, if not, the sign for the multiplier is used to determine which side of a spread a leg is on.

Figure 3:
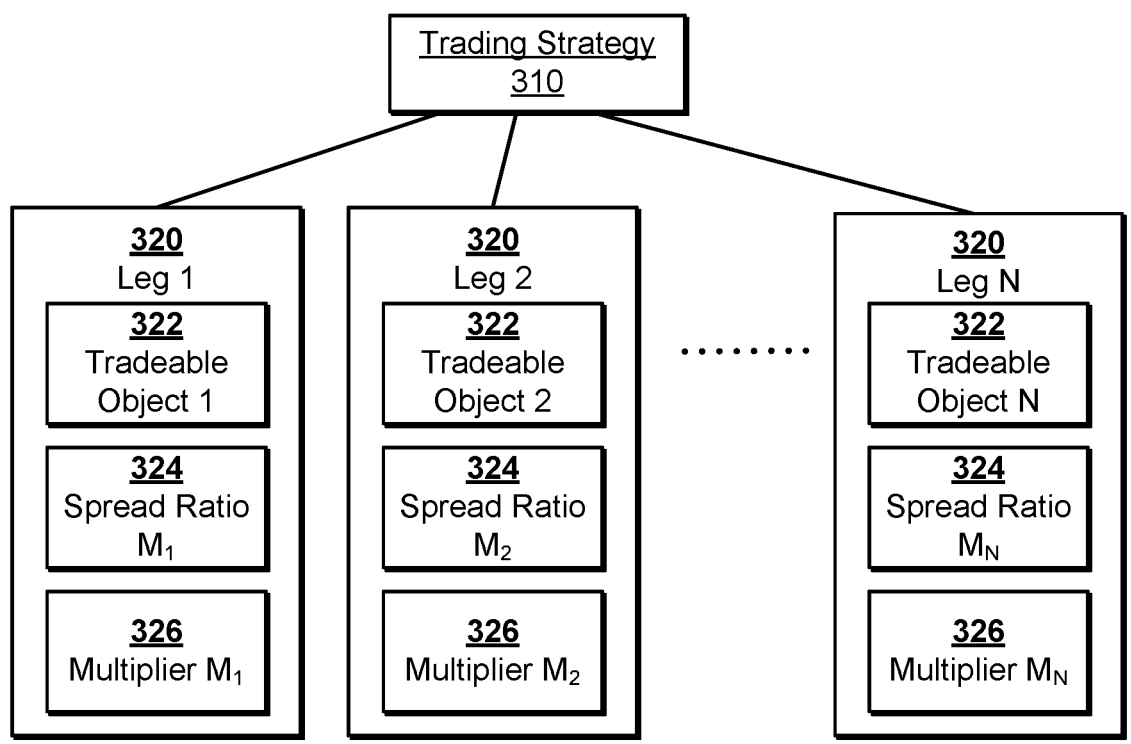
FIG. 3 illustrates a block diagram for an exemplary spread trading strategy.

FIG. 3 illustrates a diagram for a trading strategy 310, such as a synthetic spread. Trading strategy 310 includes "N" legs 320, where the relationship between tradeable objects 322 for each leg 320 is defined according to spread ratio 324 and multiplier 326 associated with each leg 320.

The tradeable objects 322 may be traded, or attempted to be traded, according to the relationship defined by the trading strategy 310. In an example, the trading strategy 310 is a spread with two legs 320: Leg 1 for tradeable object A, and Leg 2 for tradeable object B. In addition, the spread ratios 324 and multipliers 326 for Legs 1 and 2 are "1" and "4," respectively. The spread 310 is defined such that when the spread 310 is bought, 1 unit of tradeable object A is bought (positive spread ratio, same direction as the spread) and 1 unit of tradeable object B is sold (negative spread ratio, opposite direction of the spread). When the definition for the spread 310 is such that when the spread 310 is sold, 1 unit of tradeable object A is sold (positive spread ratio, same direction as the spread) and 1 unit of tradeable object B is bought (negative spread ratio, opposite direction of the spread).

The price, or target price, for the trading strategy 310 may be determined according to the definition of the trading strategy. The price is considered the sum of price of the tradeable object 322 multiplied by the multiplier 326 for each of the legs 320 of the trading strategy 310, as follows:

$$\text{Strategy Price} = \sum_{i=1}^{N} \text{Mult}(i) * \text{Price}(i) \quad \text{Eq. 1}$$

Mult(i) is the multiplier associated with leg i and Price(i) is the price for the tradeable object for leg i. One skilled in the art will also recognize that the price for a trading strategy may be affected by price tick rounding and/or pay-up ticks.

The spread may be bought or sold according to relative prices of the legs of the spread. When tradeable object A typically has a price 10 greater than tradeable object B, a trader may buy the spread whenever the difference in price between tradeable objects A and B is less than 10. Similarly, the trader may sell the spread whenever the difference is greater than 10.

As an example, a market for one unit of tradeable object A at a price of 45, and the market for tradeable object B has one unit at a price of 40. The current spread price, using Equation 1, would then be (1)(45)+(−1)(40)=5, which is less than the typical spread of 10. Thus, the trader may buy 1 unit of the spread, which results in buying 1 unit of tradeable object A at a price of 45 and selling 1 unit of tradeable object B at 40. If the typical price difference is restored, such as where price of tradeable object A is 42 and the price of tradeable object B is 32, the price of the spread would be 10. If the trader sells 1 unit of the spread to close out the position (that is, sells 1 unit of tradeable object A and buys 1 unit of tradeable object B), the trader has made a profit on the total transaction. While the trader bought tradeable object A at a price of 45 and sold at 42, losing 3, the trader sold tradeable object B at a price of 40 and bought at 32, for a profit of 8. Thus, the trader made 5 on the buying and selling of the spread.

The above example is based on sufficient liquidity and stability and that the tradeable objects can be bought and sold at the market price to achieve a desired price for the spread 310. However, more generally, a trader determines a desired price at which to buy or sell a particular trading strategy and attempts to achieve that desired price by buying and selling the legs at appropriate prices.

The trader may use an automated spread trading tool for administering appropriate trades according to the strategy 310. For example, a trader may enter an order to buy or sell trading strategy 310 at a desired price and the automated trading tool may automatically place an order (also referred to as a quoting, or working order) for at least one of the tradeable objects 322 of the trading strategy 310 to achieve the desired price for the trading strategy (also referred to as a desired strategy price, desired spread price, and/or a target price). The leg for which the order is placed is referred to as the quoting leg. The other leg corresponding to the quoting leg is referred to as a lean leg and/or a hedge leg.

The price that the quoting leg is quoted at, or working at, is based on the best price that an order could be filled at in the hedge leg, which is typically at the inside market of the hedge leg. That is, the best price is typically the best bid price of the hedge leg when selling and the best ask price of the hedge leg when buying. The best price in the hedge leg is also known as the leaned on price, lean price, or lean level.

As the leaned on price changes, the price for the order in the quoting leg may also change in order to maintain the desired strategy price. In addition, the quoting leg may not be changed if changes in the hedge leg are within a limit or would result in a change to the quote leg within a limit. When the quoting leg is filled, the automated trading tool may submit an order in the hedge leg to complete the strategy, also referred to as an offsetting or hedging order.

The price of a quoted leg may also or alternatively be based on less than all of other legs of a spread. The order parameters of an order in a quoted leg may lean on other types of market conditions in the other legs such as the last traded price (LTP), the last traded quantity (LTQ), a theoretical value, multiple quantities such as quantities closer to the inside market, or some other reference point.

In addition to having a single quoting leg, a trading strategy may be quoted in multiple (or even all) legs of a spread. In such situations, each quoted leg still leans on at least one of the other legs of the spread. When one of the quoted legs is filled, the orders in the other quoted legs are typically cancelled and appropriate hedge orders are placed.

A trading strategy with more than two or more legs is known as a multi-leg strategy, a multi-leg spread or multi-leg synthetic spread. In a multi-leg strategy, multiple sets of hedge prices can be chosen to maintain the trading strategy for a particular quoted leg. When one leg is filled, the price for the leg that was filled, the desired price for the trading strategy, and the multipliers are known and there are N−1 unknowns, corresponding to the remaining N−1 unfilled legs. Thus, in a multi-leg strategy, there are two or more unknowns but only a single equation (Eq. 1). Current systems utilize different techniques to determine the hedge prices for the remaining legs of a strategy once one leg has been filled.

When a quoting leg is filled, but at least one of the hedge legs cannot be filled, (or filled sufficiently to achieve the desired price of the trading strategy) the spread may be determined to be legged. The hedge leg may not be filled because the inside market for the hedge moved away before the hedge order was entered, and/or there may not be sufficient volume to fill the order at the inside market.

III. Spread Trading Tools

Spread trading tools, such as Autospreader, may be used to view market information for multiple tradeable objects and/or to administer a trading strategy for multiple objects. The spread trading tools also may be used to send orders for a synthetic spread in one or more legs (outright or working orders) of the synthetic spread.

The orders and fills of the orders of the synthetic spread may be managed, compiled, recorded, viewed and the like through the spread trading tool. However, because each outright order is for a particular tradeable object, other trading tools may also be used to manage the outright order. Trading tools outside of the spread trading tool may not know or be able to determine whether an outright working order was a component of or initiated as part of a synthetic spread trading strategy. A lack of a connection between an outright working order and a synthetic spread may cause a trader to track information outside of the realm or domain of the spread trading tool. In addition, other trading tools may not provide accurate results for the trader. Accordingly, inaccuracies and/or inefficiencies may not have been avoided to obtain desired data.

The exemplary methods, processes, and apparatuses herein identify and maintain a relation relationship between a synthetic spread and its constituent orders. In addition, states of a synthetic spread are defined. The working pending orders and hedge orders of a spread are identified, tracked, and managed as part of a synthetic spread. As a result, the synthetic spread may be represented and managed as a whole or as a homogeneous order. Spread trading tools may be used to manage, represent, and view synthetic spreads and their constituents.

In addition, other tools and/or applications, which are typically configured for managing orders and/or fills for other trading strategies may be employed to manage orders and fills of the constituents of a synthetic spread. For example, an order may be tracked and managed with an order descriptor identifier, such as for order management and post-trade analysis. An example for order tracking and management is provided in U.S. patent application Ser. No. 11/689,178, titled "System and Management and Analysis of Electronic Trading Orders, filed Mar. 21, 2007," which is incorporated in its entirety by reference herein.

A spread trading tool generates spread data based on information of its constituent legs and spread parameters. The spread data is communicated to or presented to the trader in a visual format, such as in a graphical user interface manager ("GUI manager"). The spread data may be displayed in a spread window. In addition, information or data for one or more leg of the spread may also be displayed using the GUI. The spread data and the information or data for each leg may be displayed in the same window or different windows for the GUI. The user can enter orders in the spread window, and the spread trading tool place orders according to the spread to obtain the desired or target price of the spread.

An example of a spread trading tool is provided in U.S. Pat. No. 7,437,325 for "System and Method for Performing Automatic Spread Trading," U.S. patent application Ser. No. 10/804,631 for "System and Method for Estimating a Spread Value," filed Mar. 19, 2004, U.S. Pat. No. 7,389,264 for "System and Method for Performing Automatic Spread Trading," U.S. Pat. No. 7,424,450 for "System and Method for Performing Automatic Spread Trading," U.S. patent application Ser. No. 12/410,759 for "Systems and Methods for Multiplier-Adjusted Lean Levels for Trading Strategies,' filed Mar. 25, 2009, all of which are incorporated fully herein by reference. In addition or alternatively, other spread trading tools may be used. Additionally, the preferred embodiments are not limited to any particular product that performs translation, storage, and display function for a synthetic spread trading.

Figure 4:
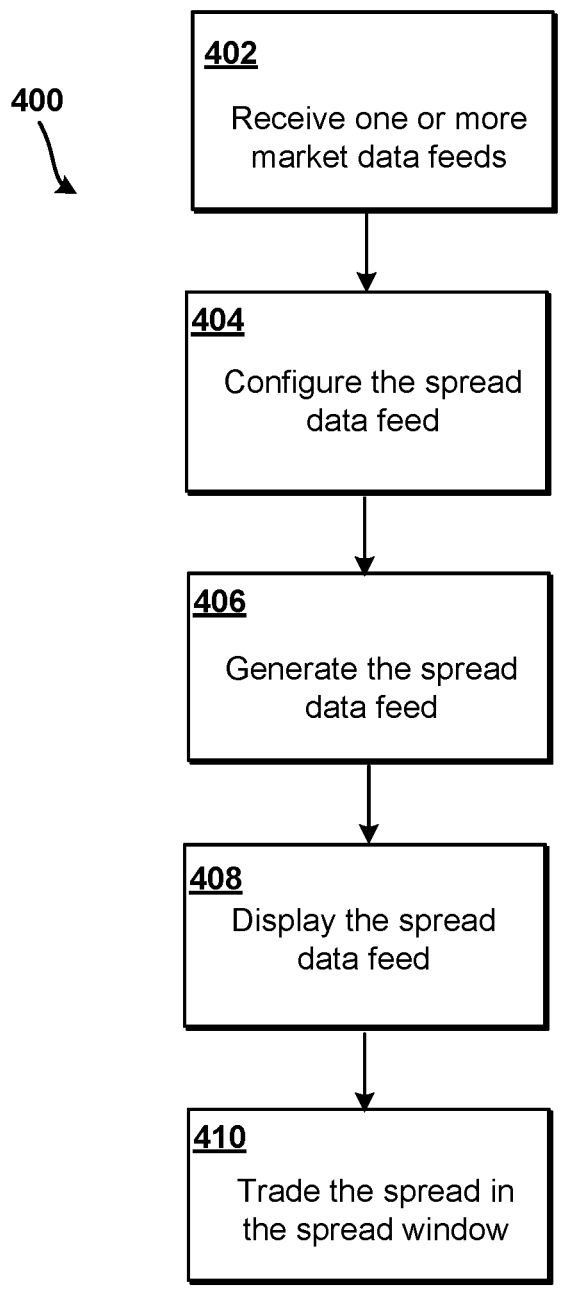
FIG. 4 illustrates a flowchart 400 for an exemplary method for facilitating synthetic spread trading.

FIG. 4 illustrates a flowchart 400 for an exemplary method for facilitating the spread trading. One skilled in the art will understand that the flowchart 100 provides an illustrative description of spread trading. In addition, an embodiment may include more or fewer acts, and/or the acts may occur in one or more orders different from the order shown in FIG. 1. For example, act 404 for "configure the spread data feed," may occur before, simultaneously or substantially simultaneously as act 402 "receive one or more market data feeds."

At act 402, market data feeds are received from one or more exchanges. A market data feed generally includes the price, order, and fill information for one or more tradeable objects. The market data feed may also include and/or otherwise identify the inside market for the tradeable object, including the highest bid price (HBP) and the lowest ask price (LAP) in addition to the current bid and ask prices and quantities in the market at other prices, referred to as "market depth." Some exchanges provide an infinite market depth, while others provide no market depth or only a few prices away from the inside market.

The number of market data feeds received at step 402 may also depend on the number of tradeable objects selected for spread trading by a user or the number of data feeds provided by an exchange, or the number of exchanges from which a data feed is received. Some or all of the data feeds from an exchange may also be received and only those tradeable objects which are part of the spread are traded.

At act 404, the spread data may be uniquely configured or customized. That is, a user may customize, among other things, calculation of spread prices and spread market depth. A calculation of spread prices and spread market depth may be based on the bids and offers from the actual markets for the tradeable objects of the legs and the spread setting parameters. The user also may re-configure existing spreads, or the user can create new spreads to configure by first selecting the underlying tradeable objects (legs) for the spread. The tradeable objects may be selected and the spread configured according to spread setting parameters in a configuration window.

At act 406, the spread trading tool may generate the spread data based on selected market data feeds and the spread setting parameters. The spread data may include spread prices and spread depth. The spread data may also include the last traded price (LTP) and/or the last traded quantity (LTQ), in addition to other items such as open, close, settlement, daily high/low, periodic high, market depth, market snapshots, and the like. The spread data may include more or fewer items. The data may be included according to parameters set, identified or otherwise selected by the user, limits of the exchange from which the market data feed came, and the like.

The trader may also customize the information included in the spread data feed. The spread data feed may be updated and stored at the client device according to the received market data feeds. The spread data feed may be continuously updated, periodically updated, continuously and periodically updated. Generating a spread data may occur on a real-time basis, or substantially real-time basis, where information that is relayed from the market is presented to the user as soon as feasible. In example, the information is presented within a sufficient or reasonable amount of time to process and display the received information.

Additionally or alternatively, generating the spread data may continue on a periodic time or semi-periodic time basis. For example, the spread data may be generated every half-second or portion of a second, according to package communication protocols, traffic conditions, combinations thereof, and the like. In an example, only those values that are displayed in a spread window that change over time are updated on the display.

At act 408, a spread window is generated and displayed. A window for each corresponding leg of the spread may also be generated and displayed. The spread window may display a spread price and an indicator for the total quantity. In addition more or fewer items may be displayed, such as the LTP/LTQ.

At act 410, one or more orders for the spread may be entered. The orders may be entered for a desired quantity at a target price for the spread. The order may be entered in the spread window. In an example, the order is entered according to manipulating one or more input devices, such as a mouse device, keyboard, light pen, combinations thereof and the like. Manipulating input device may cause an input indicator such as one or more cursors to transverse an output display. Using the input device, the cursor may be positioned with respect to the desired quantity and target price for the spread. In an example, the desired quantity may be preset or preselected such that the target price for the spread may be determined with the input device.

Figure 5:
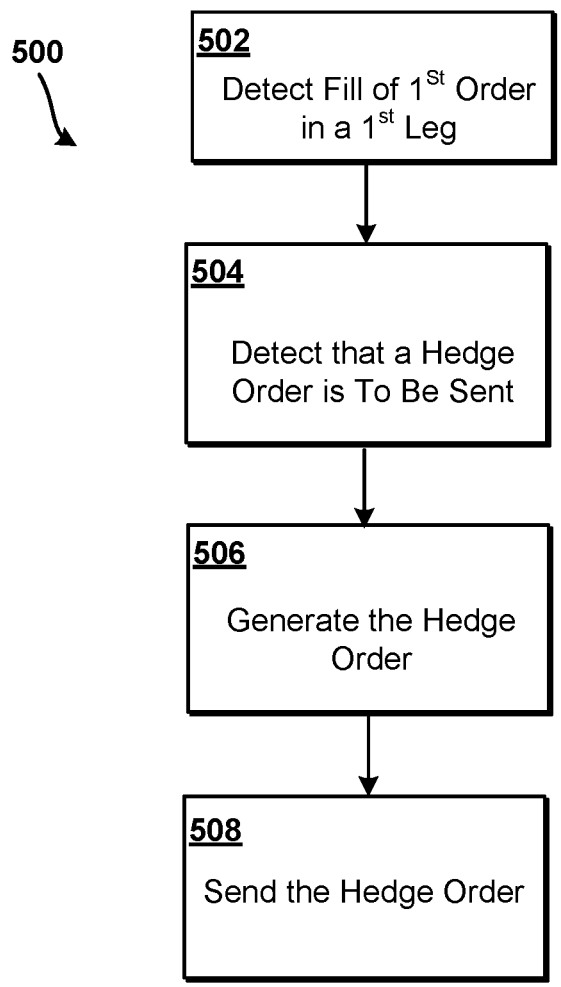
FIG. 5 illustrates a flow chart for an exemplary method for filling and executing trades for synthetic spread trading.

FIG. 5 illustrates a flow chart for an exemplary method for filling and executing trades for synthetic spread trading. Other embodiments may be executed in the order shown in FIG. 5 or in other order from that shown or discussed, including substantially concurrently or in reverse order. In addition, some steps may not be implemented to achieve the desired result.

In the example, an order for at least one leg of a spread trading strategy is working or pending at an exchange, also referred to as a quoting order. The quoting order corresponds to a first tradeable object at an electronic exchange. The quoting order may be matched against a contra order, otherwise referred to as filled or executed. At act 502, a fill of the quoting order is detected. That is, the quoting order is matched against a contra order at the exchange. At act 504, a hedge order is determined. The hedge order is to be sent in response to detecting the fill of the quoting order in the first leg of the spread trading strategy. The hedge order is generated at 506 and the hedge order is sent at act 508. The hedge order may be sent to an electronic exchange where the hedge order is listed and/or traded. The electronic exchange for the hedge order may be the same or different electronic exchange where the first tradeable object is listed. Order parameters for the hedge order, such as a hedge order price, may be determined. The order parameters may be determined so that a spread price for the spread trading strategy is achieved when the hedge order is filled.

Figure 6:
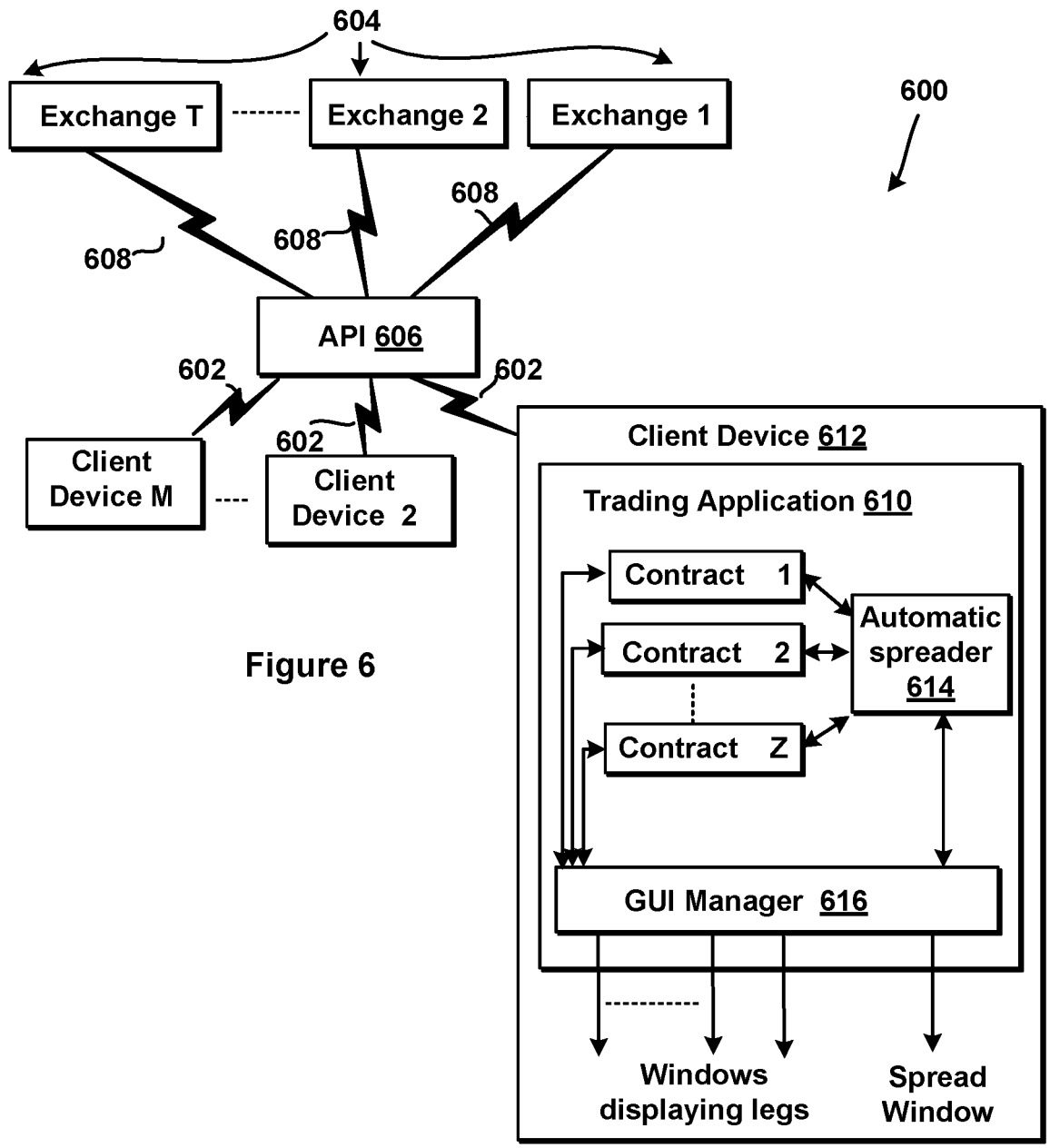
FIG. 6 illustrates a block diagram for synthetic spread trading.

FIG. 6 illustrates a block diagram for an exemplary system 600 for synthetic spread trading. The system 600 includes an applications program interface ("API") 606, exchanges 604, client devices, communications 602 between the API 606 and client devices, and communications 608 between the API 606 and the exchanges 604. The communications 608 between the API 606 and the exchanges 604 may include information such as market data.

The market data may include information for one or more tradeable objects. The API 606 may translate the market data. The market data is generally provided in a data format, such as one or more market data feeds. The market data feed may be communicated between the exchanges 604 and trading applications of the client devices. The client devices may be configured and arranged as previously described. The system 600 includes "T" exchanges and "M" client devices. The system is generally unlimited in the number of exchanges and client devices.

Client device 612 illustrates a more detailed block diagram. Client device 612 may include several components, including a trading application 610, an automatic spreader 614, and a GUI manager 616. It should be understood that fewer or more components may be included. Some of the components which are not shown will be understood to be included with client device 612.

The trading application 610 and the automatic spreader 614 may be software applications. The trading application 610 and the automatic spreader 614 may be hosted on the client device 612 or other device associated with the client device 612. Although the automatic spreader 614 is shown together with the trading application 610, the automatic spreader 614 and the trading application 610 may be the same software application or separate software applications on the same or different client devices 612. The automatic spreader 614 and/or the trading application 610 may be hosted on a server and accessed by the client device 612 over a network.

The GUI manager 616 may be implanted with a software application, hardware, or combination of hardware and software. The GUI manager may be employed with an input device like a mouse, keyboard, touch screen, and an output device such as monitor. The trading application 610 may be X_TRADER® from Trading Technologies, Inc. of Chicago, Ill. The X_TRADER application may incorporate display screens, sometimes referred to as MD_TRADER-style displays that show information, such as market depth or working orders, in association with an axis or scale of prices or values. The invention is not limited, however, to any particular type of display.

The information or market data may be stored and/or updated. Using some or all of the market data feeds and the spread setting parameters, the automatic spreader 614 generates the spread data. The market data feeds or contracts for multiple tradeable objects may be used to determine data for the synthetic spread. The spread data may include spread price, and spread market depth. The spread data may also include other items, such as the last traded price (LTP) and the last traded quantity (LTQ), high price, low price for a time or period of time and the like.

The spread data may be displayed in a spread window. The spread data may be displayed during spread generation and/or after spread generation. Synthetic spreads may be established, spread data presented, and tools provides for trading synthetic spreads as described in U.S. Pat. No. 7,437,325, titled "System and Method for Performing Automatic Spread Trading," which is incorporated by reference herein in its entirety.

IV. Spread Displays

FIG. 7 illustrates an example of a spread window 700 for a spread strategy having two legs. The first leg is displayed in window 702 and the second leg is displayed in window 704. The first leg window 702 corresponds to a tradeable object for an FJUN10 contract, and the second leg window 704 corresponds to an FDEC10 contract. FIG. 7 illustrates a spread window 700 and two leg windows 702 and 704 (a two-leg spread) for sake of simplicity and clarity. The number of windows displayed may depend on the number of legs in the spread and/or the user's preferences. Any number of legs of the spread may be possible.

The spread window 700 shows an inside market and the market depth of the generated spread data feed. The inside market includes the best bid, or highest bid price, and the best ask, or lowest sale price for the tradeable object. The windows for the legs 702 and 704 also show the inside market for the respective tradeable object. Each window 700, 702, and 704 includes a column for buy orders and a column for sell orders in the market. Columns 706, 708, and 710 include buy orders and columns 712, 714, and 716 include the ask order.

Indicators may be displayed in each of the columns 706, 708, 710, 712, 714, 716 to indicate orders for the tradeable object. For example, an indicator may be provided in column 706 to indicate a buy order in the market for the tradeable object of the first leg. Similarly, an indicator may be provided in column 714 to indicate a buy order for the second tradeable object in the market for the tradeable object of the second leg. The indicators may be graphic, iconic, numeric or any other any representation of for an order.

The windows 700, 702, and 704 each have a respective column 718, 720, and 722 with price levels. The price levels may be aligned along an axis. Each axis may be linear or curvilinear and may be static, substantially static or dynamic. That is, the price level may not change, may change in response to an automatically generated instruction, may change in response to a user instructions and/or settings, may change in response to market data or changes, may change in response to any combination of automatic instructions, user instructions and/or setting, market data and the like.

The indicators may be located along a price level along price columns 718, 720, and 722. The location of the indicator with respect to the price column 718, 720 and 722 may represent a price for the order corresponding to the indicator. In an example, an indicator for "2" displayed in column 708 at 0.97 represents an order for a quantity of 2 at a price of 0.97 in the market for the tradeable object of the second leg of the spread trading strategy.

Columns 724, 726, and 728 provide indicators for working orders for the user. In an example, an indicator is displayed in one of the in columns 724, 726, and 728 at a price level of the corresponding price column 718, 720, and 722 to display an order for quantity of the tradeable object at the price corresponding to the price level.

Columns 730, 732, and 734 display indicators representing other items or data. For example, indicators may represent a last trade quantity and/or last traded price for the tradeable object. For example, a "17" displayed in column 732 at a price level of 0.97 represents the last traded order for a quantity of 17 at a price of 0.97 of the tradeable object of the first leg of the spread trading strategy.

The windows 700, 702, and 704 may be display one or more icons or fields of interest to the user to tailor to personal preferences and/or interests. Some icons or items that are displayed or hidden by the user include a system clock that shows the current time.

In addition, icons or buttons may be displayed to represent functions. The icons or buttons may be selected to perform one or more corresponding functions. For example, a Stop Market (SM) button and/or a Stop Limit (SL) button may be displayed. The button may be selected to enable stop limit and stop market orders, respectively. A "Del All" button also may be provided to delete bids and offers from the market. A "Del Bids" and/or "Del Asks" button may be selected to delete all bids/asks from the market. Instead of displaying "Bids" or "Asks," each button may include an additional indicator representing a total number of bids/asks in the market to be deleted. More or fewer buttons may be included.

V. Order Relationships and Identification

A parent child relationship for the synthetic spread trading strategy may be defined. In an example, a synthetic spread order may be represented by, or associated with, one or more parent orders. The outright orders in each leg of the synthetic spread order may be represented by, or associated with, child orders. That is, each outright quoting order may be represented by one or more child quoting orders, and resulting hedge orders may be represented by one or more child hedge orders. Both the child quoting orders and child hedge orders are associated with one of the parent orders. A parent order may have multiple child orders. The number of parent order may depend on the number of legs of the synthetic spread, the number of quoting legs of the synthetic spread, user preferences, combinations thereof and the like.

A parent order represents one lot of a synthetic order. The corresponding children orders of the parent order represent native orders that comprise the one lot parent order. In an example, the parent order defines a synthetic spread having 2 legs at a 1:1 ratio. The user enters a one lot order for the spread and quotes only the first leg. Accordingly, there is one parent order, one child order being quoted for the first leg, and a child order for the hedge for the second leg.

In another example, shown in Table 1 below, the synthetic spread has 2 legs having a 3:2 ratio. The user enters a 2 lot order for the spread, and quotes one leg.

TABLE I

| Leg A | Leg B |
|---|---|
| Synthetic Parent Order #1 (POID = 100) | |
| Quoting Order #1 (COID = 2000) | Hedge Order #1 (COID = 2003) |
| Quoting Order #2 (COID = 2001) | Hedge Order #2 (COID = 2004) |
| Quoting Order #3 (COID = 2002) | |
| Synthetic Parent Order #2 (POID = 101) | |
| Quoting Order #1 (COID = 2005) | Hedge Order #1 (COID = 2008) |
| Quoting Order #2 (COID = 2006) | Hedge Order #2 (COID = 2009) |
| Quoting Order #3 (COID = 2007) | |

Accordingly, because each parent order represents a single lot for the synthetic spread order, there are two parent orders, one for each lot of the 2-lot synthetic spread order. Each parent order may be identified by a Parent Order Identification ("POID") and each child order may be identified by a Child Order Identification ("COID").

Table I shows that each parent order may be associated with 5 corresponding child orders, where each of the child order is for a 1-lot order. Parent order POID 100 has child orders 2000-2004, including 3 child quoting orders COID 2000-2002 in the first leg of the synthetic spread and two child hedge orders COID 2003 and 2004 in the second or hedge leg of the synthetic spread. Similarly, parent order POID 101 has child orders COID 2005-2009, where COID 2005-2007 are child quoting orders in the first leg and child hedge orders COID 2008 and 2009 are hedge orders in the second or hedge leg.

One or more orders representing child quoting orders COID 2000-2002 may be sent to an exchange for the tradeable object of the first leg of the synthetic spread. Although Table I shows multiple child orders, a single quoting order for multiple lots may be sent for the tradeable object of the first leg, where the quoting order represents all or some of the child quoting orders COID 2000-2002 and 2005-2007. That is, outright orders submitted to the exchange for execution of a leg of the spread may be for a quantity greater than a 1 lot order, where the outright order represents more than one child order. In the above example, parent order POID 100 has child orders 2000-2004, and parent order 101 has child orders 2005-2009. All or part of the child quoting orders may be combined into a single quoting order. In addition, all or part of the child hedge orders may be combined into a single hedge order, or may be combined into multiple hedge orders according to matching of quantities of the quoting order associated with or represented by the child quoting orders.

In the above example, the three quoting orders COID 2000-2002 may be combined into a single child quoting order with a quantity of 3, and the two potential hedge orders COID 2003 and 2004 may be combined into a single hedge order with a quantity of 2. In addition, a single quoting order for a quantity of 6 may be submitted for the first leg, where the quoting order represents each of the child quoting orders for both parent orders One or more hedge orders for child hedge orders COID 2003 and 2004 may be submitted for the tradeable object of the second leg after some or part of the quoting order representing one or more of the child quoting orders have been filled/executed. That is, a hedge orders may be submitted for execution based on execution of the quoting orders. In addition, the child hedge orders of the hedge order may be associated with the parent order, and/or child quoting orders, when the hedge order is submitted for execution. For example, where a single quoting order with a quantity of 3 was partially filled (e.g. filled at a quantity of 2), a single hedge order with a quantity less than the total quantity for the hedge (e.g. a 1 lot), may be submitted at the inside market for the hedge. In another example, when a quoting order representing child quoting orders is submitted and a portion the child quoting is filled representing child quoting orders 2000-2002, a hedge order for a quantity of 2 representing child hedge orders 2003 and 2004 is submitted. In addition, child hedge orders 2003 and 2004 are associated with parent order POID 100.

The parent order and child order ID's (POID and COID, respectively) illustrate a desired behavior for tracking, recording and reporting synthetic spread orders. A COID may identify or associate (or may be used to identify or associate) a parent order with the child order of the COID. Similarly, a POID may identify or associate (or may be used to identify or associate) child orders with the parent order of the POID. In addition, the COID may identify or associate (or may be used to identify or associate) child orders of a parent order.

Table I illustrates a how orders for a synthetic spread, and its constituent orders may be identified and related. Other representations of the synthetic spreads may be possible. In addition, although Table I illustrates multiple child orders of each parent, each child order may be separate and distinct orders, may be a combined order, or some may be combined while other child orders may be separate and distinct.

The order identifiers (POID and COID) may take any format. The order identifier may provide a defined descriptor for marking orders. The order identifiers may have a format that identifies each parent order and each child order of the parent. The format may distinguish parent and child orders of a synthetic order from parent and child of other synthetic spread orders. The orders may have a format that identifies each parent of a multiple lot synthetic order and distinguishes each parent order from other parent orders. The identifiers may have a format that is automatically determined, manually determined, such as in accordance with user setting and/or preferences, or a combination of automatically and manually determined. The identifier for an order may be generated when, or before an order is entered and/or submitted to for execution, such as to an exchange.

The order identifiers may define a purpose of the order. The order identifiers may also or alternatively identify an application/strategy from which the order originated or to which the order pertains. For example, an order identifier may define the order as a hedge order that was originated by an auto-spreader or similar tool. An order identifier also may represent the status of the order or corresponding trade. For example, an order identifier may represent an order that was filled and initiated with a hedge order, as well as the corresponding tradeable object and price for the order.

Order identifiers may include a fill key which may associate a hedge order with the fill of a corresponding order that triggered the hedge order. Additional spread data may be identified, including a desired price for a synthetic spread, identification of other legs, time the order was placed, time the order was filled. Additional, or fewer identifiers and formats could also be used as these parameters are provided as examples. Order identifiers may be provided as described in U.S. patent application Ser. No. 11/689,178, filed Mar. 21, 2007, titled "System and Method for Management and Analysis of Electronic Trade Orders," which is incorporated by reference herein in its entirety.

VI. States of Orders

Different states of a parent order may be defined. The states of the parent order include working, pending, legged, or filled. The state may be determined according to the status of child orders associated with a parent order. The state may also be determined according to other factors, such as user preferences and/or settings. The state of the parent order also may be identified numerically.

For a spread order with multiple quantities and having multiple parent orders, a number for each state may identify the quantity of the order in the corresponding state. For example, for a spread order for a 3-lot or a quantity of 3, all 3 of the synthetic spread order may be initially working. Accordingly, the state of the synthetic spread may be 3 working orders.

Later, the spread order may have 1 lot working, 1 lot pending, and I lot that is filled. Accordingly, the state of the synthetic spread order will be 3 working orders, 1 pending order, and 1 filled order.

A parent order may be considered working when 1) the child quoting orders of the parent order have been sent to be filled, such as to an exchange, and none of the child quoting orders have been filled. A parent order may remain working when one or more child quoting child orders may have been deleted but the parent order may be completely or substantially filled as defined for the synthetic spread. For example, there are no orders that have been cancelled that would prevent the parent order to be filled according to a ratio for the synthetic spread.

A parent order may remain working if some of the constituent child orders have been deleted, but the parent order may yet be completed or filled. For example, a parent order may be filled when at least two legs of the synthetic spread are being quoted. In general, the parent order may be working when at least one child quoting order of the parent order is working.

In an example, a parent order POID 100 having 5 child orders, including 3 child quoting orders, and 2 hedge orders as shown in Table I, is working when the three child quoting orders are working. When the synthetic order is for multiple lots (i.e. the synthetic order is for 2 lots), the synthetic order will have two parent orders, one for each lot of the synthetic order. The parent orders will both be working when the quoting orders for both parent orders are working and none of the parent order have been filled or deleted where it would not be possible to fill the parent order. Accordingly, a synthetic order for n-lots of a spread may generate n parent orders. In an embodiment, all the child quoting orders may be considered working when a quoting order for a quantity of 6 has been submitted (each child quoting order 2000-2002 and 2005-2007), and has not been filled, either partially or fully.

In another example, a parent order may have 2 child orders, including a child quoting order for a quantity of 3 in the first leg, and a potential hedge order for a quantity of 2 for the second leg. The parent order may be considered working when the child quoting orders is working. When the synthetic order is for multiple lots (i.e. the synthetic order is for 2 lots), the synthetic order may also be represented with a single parent order at a quantity of 1, where the parent order is working when the quoting order for the parent order is working.

A parent order may be considered filled when all child orders of the parent order have been filled. More particularly, the parent order is considered filled when the child quoting orders and the child hedge orders of the parent have both been filled/executed in accordance with quantities specified for the spread.

A parent order may be considered pending when at least one of the child quoting orders of the parent has been filled, when at least one of its child quoting orders is working in the market as a managed order, and when none of the child hedge orders have been legged or have been deleted. In an example when one or more child orders have been deleted, such as through an outright deletion of the child order, the parent order may be considered pending when the parent order may be filled, such as according to the spread ratio. If it is not possible to fill the parent order, the parent order may be cancelled or otherwise not considered part of a synthetic spread.

A parent order may be considered legged when at least one order of the parent order is not filled, or cannot be filled. For example, a market for a hedge leg of the spread may have moved away before the order was placed, entered, or before the order could otherwise be filled according to the spread. The child hedge order that is not yet filled, may be considered legged. A parent order may be legged where one of the child hedge orders was deleted, such as through an outright deletion. A child quoting order may be considered legged if the child quoting order changed from a managed order to an unmanaged order. For example, a user preference may be selected to change a child quoting order from managed to unmanaged for hedge round functionality.

In an example shown in Table II below, a synthetic spread order for 2-lots of a two-leg spread having a 3:2 ratio has been placed. In addition, the synthetic spread order in Table II is set up to be quoted in both legs of the spread. The synthetic spread order initially may be represented by two parent orders, each having 10 child orders, including three child quoting orders in the first leg and two corresponding potential child hedge orders for the second leg for each parent and two quoting orders in the second leg and three corresponding hedge orders for the first leg for each parent. Although the synthetic spread order may be represented by multiple spread orders each for a single lot, the synthetic spread order also may be represented less parent orders, where each order is for multiple lots or for a quantity greater than 1.

TABLE II

| Leg A | Leg B |
|---|---|
| Synthetic Parent Order #1 (POID = 100) | |
| Quoting Order #1 (COID = 2000) | Hedge Order #1 (COID = 2003) |
| Quoting Order #2 (COID = 2001) | Hedge Order #2 (COID = 2004) |
| Quoting Order #3 (COID = 2002) | |
| Hedge Order #1 (COID = 2005) | Quoting Order #1 (COID = 2008) |
| Hedge Order #2 (COID = 2006) | Quoting Order #2 (COID = 2009) |
| Hedge Order #3 (COID = 2007) | |
| Synthetic Parent Order #2 (POID = 101) | |
| Quoting Order #1 (COID = 2010) | Hedge Order #1 (COID = 2013) |
| Quoting Order #2 (COID = 2011) | Hedge Order #2 (COID = 2014) |
| Quoting Order #3 (COID = 2012) | |
| Hedge Order #1 (COID = 2015) | Quoting Order #1 (COID = 2018) |
| Hedge Order #2 (COID = 2016) | Quoting Order #2 (COID = 2019) |
| Hedge Order #3 (COID = 2017) | |

In the initial state, when the order for the synthetic spread is placed and no orders have been filled/executed, $SO_W=2$, $SO_P=0$, $SO_L=0$, and $SO_F=0$, where:

$SO_W$=Number of Working Parent Orders,
$SO_P$=Number of Pending Parent Orders,
$SO_L$=Number of Legged Parent Orders, and
$SO_F$=Number of Filled Parent Orders Referring to FIG. 7, when the order for the synthetic spread is entered or otherwise submitted for trading, a status indicator 736 may be positioned and/or displayed in column 724 to indicate the status of the synthetic order. The selection of the price and entry of the order may result in response to numerous inputs. The order may be entered according to a selection of a quantity and a price along the price column 718. The order also may be entered according to selecting a price along the price column where a quantity is preselected or predetermined. The selection of the price may occur in response to one or more clicks or other manipulation or activation of an input device to send an instruction to send at a price.

The status indicator 736 may be positioned at a price level along the price column 718 of the spread window 700 corresponding to a price of the order. The status indicator 736 may be any indicator, such as numerical, iconic, graphic, color coded or combinations thereof to identify the status of the order. For example, a status indicator for a legged synthetic spread order or a legged portion of the synthetic spread order may be numerically displayed in a red colored font to show the quantity of the synthetic spread order that is legged.

The status indicator 736 may represent one or more of the trader's orders. The status indicator 736 also may represent the state of the trader's order, including how many orders were placed, how many orders are working, how many orders have been filled, how many orders are pending, how many orders have been legged, whether the order is to buy or to sell, and/or combinations thereof. In the example shown in FIG. 7, the status indicator 736 shows 2 working orders according to the designation of "2" proximate the designation "W." In addition, the status indicator 736 shows that no orders of the synthetic spread have been filled or bought according to the designation "0" proximate the designation "B." Accordingly, two orders for the synthetic spread are working and no orders have been filled, or bought, and no orders have been legged or are pending.

FIG. 7 further shows status indicator 738 in the legs of the spread. The status indicator 738 may be similar to status indicator 736 and may represent one or more orders for the corresponding tradeable object of the leg. A status indicator 738 may be any indicator, including an iconic indicator, a graphic indicator, a numeric indicator or the like to represent an order in a leg of the spread. The status indicator 738 may also represent outright orders in each leg, or orders that are associated with a spread. The status indicator 738 may represent one or more of the trader's orders. The status indicator 738 also may represent the state of the order, including how many orders were placed, how many orders are working, how many orders have been filled, how many orders are pending, how many orders have been legged, whether the order is to buy or to sell, and/or combinations thereof.

In FIG. 7, a status indicator 738 is located at 1.06, 1.02, and 0.97 of the price column 720 in the first leg window 702 and at 1.05 and 1.02 of the price column 722 of the second leg window 704. The leg window may display a designation for the status of the order(s) represented by the status indicator 738, such as how much of an order is filled (e.g., bought="B", sold="S"), working ("W"), pending ("P"), and/or legged ("L").

FIG. 7 further shows leg status indicators 740. Each leg status indicator identifies an order for a tradeable object associated with the leg of the synthetic spread. In the example shown in FIG. 7, a leg status indicator is located at 0.97 of the first leg 702 of the synthetic spread and 1.05 of the second leg 704 of the synthetic spread. The leg status indicator identifies that one or more orders represented by the status indicator 738 are associated with the synthetic spread.

As discussed for the example provided in Table II, FIG. 7 shows two synthetic spread orders were placed at ~0.030. Because the synthetic spread is defined as a 3:2 ratio, a quoting order in the first leg for a quantity of 6, representing the 6 child quoting orders of the first leg, was submitted at a price of 0.97 for the tradeable object of the first leg 702. In addition, a quoting order in the second leg for a quantity of 4, representing the 4 quoting orders of the second leg, were submitted at a price of 1.05 for the tradeable object of the second leg.

FIG. 8 shows an example after a portion of the quoting order has been filled and at least one corresponding hedge order has been filled. More particularly, a portion of the quoting order in the first leg A representing three child quoting orders COID 2000-2002 in the first leg A have been filled, and a hedge order representing child hedge order COID 2003 in the second leg B has also been submitted and filled. In addition, because the child quoting orders COID 2000-2002 have been filled, child quoting orders COID 2008 and 2009 have been deleted or cancelled, and the corresponding a hedge order for child hedge orders COID 2005-2007 is not sent or submitted for execution. The quoting order for child quoting orders COID 2010-2012, 2018 and 2019 for the second parent order POID 101 is working and has not been filled/executed. Parent order POID 100 is considered legged and parent order POID 101 is working. Therefore, $SO_W=1$, $SO_P=0$, $SO_L=1$, and $SO_F=0$.

As such, the status indicators 736 and 738 in FIG. 8 have been modified over the status indicators in FIG. 7 to reflect the changes. More particularly, the status indicator 736 at −0.030 for the synthetic spread order has been modified to reflect that one of the initial orders is working ("W 1"), the other order is legged ("L 1"), and no orders have been filled/executed ("B 0") and no orders are pending. In addition, the status indicators 738 associated with the synthetic spread in each leg 702 and 704 also reflect the changes. The status indicator 738 at 0.97 in the first leg 702 reflects that three orders are working ("W 3"), and three orders have been bought ("B 3"). The status indicator 738 at 1.05 in the second leg 704 represents the child quoting COID 2018 and 2019, and reflects that zero order have been sold ("S 0") and two orders are working ("W 2"). In addition, a status indicator 738 has been positioned at 1.00 to represent that one of the hedge orders has been sold ("S 1") and one of the hedge orders remains working ("W 1").

Figure 9:
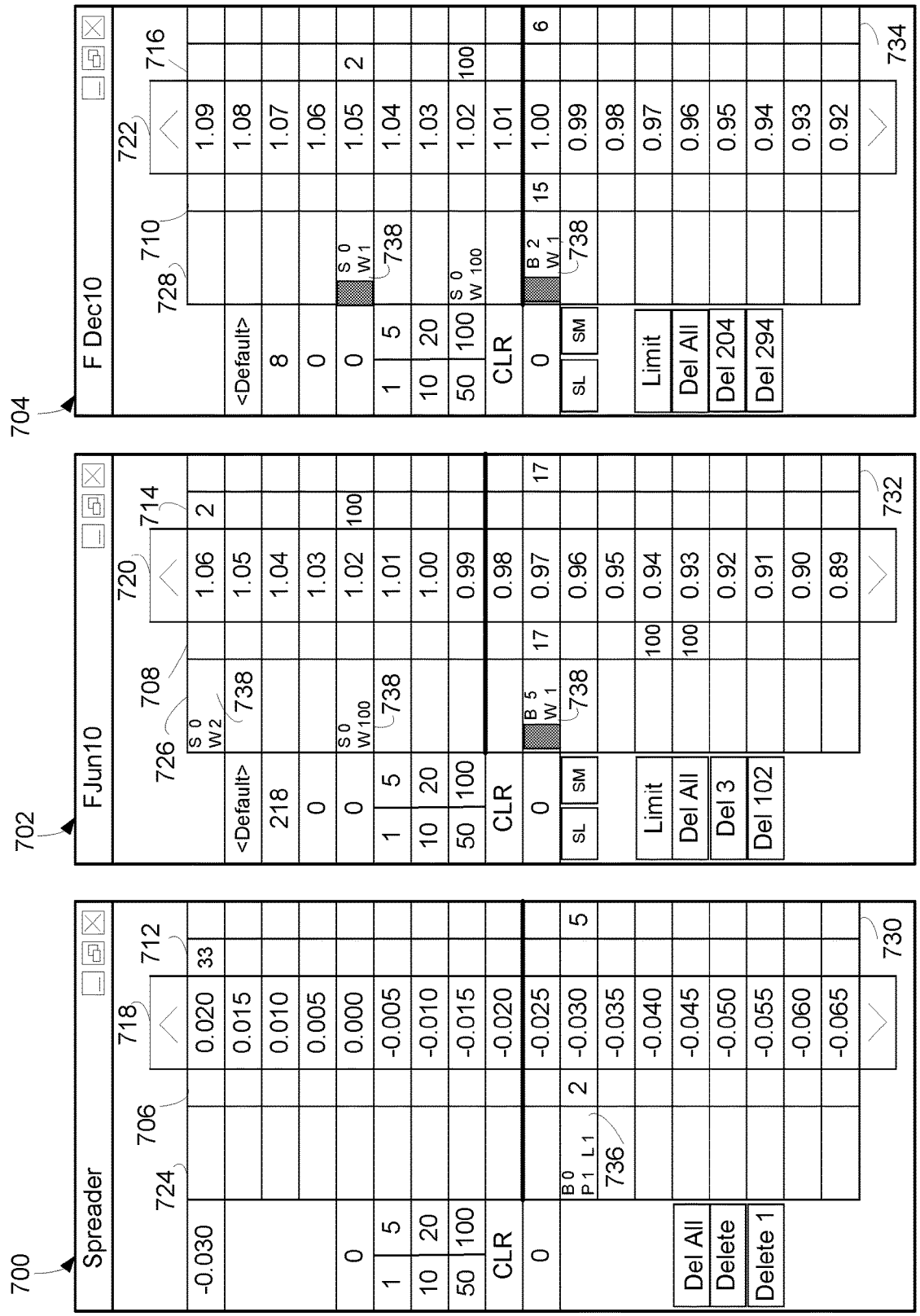
FIG. 9 illustrates an example of a spread window after additional child orders have been filled.

FIG. 9 illustrates an example of the spread window display after further child orders have been filled. More particularly, the child quoting orders COID 2010 and 2011 have been filled, and an order for child hedge order COID 2013 has been submitted for the tradeable object of leg B in the synthetic spread. The order identification of the child hedge order COID 2013 allows child hedge order COID 213 to remain associated with parent order POID 101. Parent order POID 101 has child quoting orders COID 2010, 2011 and 2013 that have been filled/executed. In addition, child quoting order COID 2018 has been deleted and child hedge orders COID 2015 and 2016 will not be sent. Accordingly, as above, parent order POID 100 is legged, and parent order POID 101 is now pending where $SO_W=0$, $SO_P=1$, $SO_L=1$, and $SO_F=0$.

As such, the indicators 738 in FIG. 9 represent the current status of the synthetic spread. The status indicator 736 at −0.030 for the synthetic spread order has been modified to reflect that one of the initial orders is pending ("P 1"), the other order for the spread remained legged ("L 1"), and no orders have been filled/executed ("B 0"). The status indicator 738 at 0.97 in the first leg 702 reflects that one order is working ("W 1"), and five orders have been bought ("B 5"). The status indicator 738 at 1.05 in the second leg 704 represent the remaining child quoting order COID 2019 and now reflects that zero orders have been sold ("S 0") and 1 order is working ("W 1"). In addition, the status indicator 738 at 1.00 represents that another hedge orders has been sold ("S 2") and one of the hedge orders remains working ("W 1").

When the orders for the synthetic spread have been filled where that the parent orders of the synthetic spread are not pending and not legged, the indicators 736 and 738 may be removed. Accordingly, when the synthetic spread order is filled such that indicators 736 and 738 may not be displayed in windows 700, 702 and 704.

A synthetic spread order may have a defined lifetime or a status for various stages during its lifetime. The synthetic spread order may be maintained, managed, reported and otherwise administered as an integrated tradeable object. In general, the lifetime of the synthetic spread order will end when all orders of the spread have been filled, child orders have been deleted, or when the synthetic spread order has been deleted.

The parent-child relationship and the states of the parent and child orders may be used to track, represent, manage, report, record, and otherwise administer trading for synthetic spreads, including orders for a spread, orders for components of a spread, and fills for the spread and its components.

For example, a synthetic spread with filled quoting orders from multiple legs is identified, tracked and managed. Tools, such as the Autospreader tool, may be used to maintain and update the states of the parent and orders and also may be used to maintain and update the counts for $SO_W$, $SO_P$, $SO_L$ 1, and $SO_F$ as described. The tools may maintain and update the counts while the synthetic order exists. For example, an outright fill that completes a synthetic spread order may be counted and reported as a fill of the synthetic spread order. After the synthetic spread order is filled, additional or alternative tools may be used to maintain, report, process and other administer trading. In addition, tools may be used before a synthetic spread order is placed or submitted for execution.

After it is entered, the synthetic spread may be reported as a single and/or integrated tradeable object. In addition, a submitted order (i.e. working or pending) synthetic spread may also be managed by tools other than the spread tool that launched the synthetic spread.

FIG. 10 illustrates an example of an order book tool 1000 for a synthetic spread. The order book tool 1000 illustrates a synthetic spread entry 1002 corresponding to an order for a synthetic spread that has been submitted and is currently working or pending, such as in an order book at an exchange. The order book tool 1000 may be used to present information about pending or working orders. The orders may be the trader's order, and/or orders for multiple traders. The order book tool 1000 may display one or more parameters for one or more orders. The number and type of parameters displayed in the order book tool may user-selectable and be configured according to user preferences. The order book tool 1000 may display a status of the order, whether the order is a buy or sell, the quantity, the tradeable object name, product name or product type, type of tradeable object or contract, price of the order, a corresponding stop price, type of order, TIF, restrictions, an executed quantity and working quantity of the order, an associated account no, and an order number.

The order book tool 1000 may include entries for one or more synthetic spreads 1002 and outright orders 1004. The synthetic spread order entry 1002 may be reported or presented in the order book tool as an integrated order. That is, even though multiple orders may be presented or submitted for execution, the synthetic spread order may be reported as a single order, or an aggregate of the constituent orders for the synthetic spread. Accordingly, the order book 1000 may present order entries for a synthetic spread order 1002 as an integrated tradeable object as well as outright orders 1004. The synthetic spread order entry 1004 indicates that entry is for a spread by designating "Autospread" under a product column whereas the outright orders designate the product "ES." Of course, one skilled in the art will recognize that other designations may be possible to distinguish synthetic spread orders from outright orders for a tradeable object.

Because the synthetic spread order entry 1002 is reportable a tradeable object, such as in an order book tool or the like, the tool may be used to manage the synthetic spread order, and its constituent parent and child orders. The synthetic spread order entry 1002 may be selected, and functions performed on the corresponding synthetic spread order. For example, the synthetic spread order may be deleted or cancelled, a quantity of the synthetic spread order may be changed to be decreased or increased, a price of the synthetic spread order may be decreased or increased and the like. When a function is selected to be performed on a synthetic spread order, corresponding or constituent orders of the synthetic spread order will managed according to the function performed on the synthetic spread order, as described further. For example, in response to deleting a synthetic spread with no filled or executed child orders, constituent child orders of the deleted synthetic spread order may be deleted.

Other parameters of the synthetic spread order also may be changed. An order such as the synthetic spread order entry 1002 may be changed by selecting the entry 1002 and changing a selected or designated parameter of the order. The parameter may be changed by selecting a corresponding tool or function of a tool bar 1006. For example, to delete all orders in the order book, a user may select a "Delete All" button on the tool bar 1006. The tool bar may have buttons for designated functions. Additionally or alternatively, a drop down menu may be provided from which one or more functions may be selected.

A filled synthetic spread order may be reported and managed in a fill window tool 1100. FIG. 11 illustrates an example of an order book tool 1100 for a synthetic spread. The fill window tool 1100 may be used to present information about and to manage filled orders. The filled orders may be the trader's order, and/or orders for multiple traders. The fill window tool 1100 may display one or more parameters for one or more filled orders. The number and type of parameters displayed in the fill window tool may user-selectable and be configured according to user preferences. The fill window tool 1100 may display a status the time of a fill, the exchange where an order was filled, a quantity filled, price of the filled order, the product and contract of the filled order, an account number, the exchange's time of the fill, an order number, the date of the filled order, and the time the order was placed or received by the exchange.

A filled synthetic spread order 1102 may be reported or included in the fill window tool 1100 as an integrated order. Filled parent orders of a filled synthetic spread order may be combined and reported in one fill or may be independently displayed as filled orders. In addition, filled child orders of the filled synthetic spread may also be reported or included in the fill window tool 1100. Even though multiple orders may have been filled to complete the synthetic spread order, the synthetic spread order may be reported as a fill for a single order, a single fill, or an aggregate of the constituent orders for the synthetic spread. Accordingly, the fill window tool 1100 may include entries for a synthetic spread order 1102 as an integrated tradeable object as well as outright orders 1104. The synthetic spread order entry 1102 indicates that entry is for a spread by designating "Autospread" under a product column whereas the outright orders designate the product "ES." Of course, one skilled in the art will recognize that other designations may be possible to distinguish synthetic spread orders from outright orders for a tradeable object.

FIG. 12 illustrates an example of a market grid or market window tool 1200 for a synthetic spread. The market grid window 1200 may include a synthetic spread entry 1202 for reporting information about the synthetic spread and for launching orders for the synthetic spread orders for execution. Although multiple orders may be submitted as a result of submission of a synthetic spread order, the synthetic spread order may be reported as a single order in the market window 1200. A synthetic spread order may be launched from the market window 1200 as a single tradeable object. An example of a market grid is provided in U.S. Pat. No. 7,437,325, titled "System and Method for Performing Automatic Spread Trading," which is incorporated by reference in its entirety herein.

Orders of a synthetic spread may be considered managed or unmanaged. Quoting and child hedge orders may be considered managed because one or more tools, such as a spread tool (i.e., Autospreader), controls behavior of the managed orders, such as when and how the managed order get submitted, changed, and/or deleted. When the synthetic spread is created and submitted, one or more child quoting orders are created and submitted for execution. In addition, one or more child hedge orders may be created and held, or otherwise targeted for execution so that submission of the child hedge orders is triggered by execution of one or more of the child quoting orders of the synthetic spread. The managed child orders may be considered the quoting and child hedge orders of the synthetic spread. A Legged hedge orders, or hedge orders which have been otherwise submitted for execution but not filled, may be considered unmanaged orders of the synthetic spread. The spread trading tool, or other tool for tracking and reporting synthetic spread orders, may track unmanaged constituents of a synthetic spread, but may no longer control behavior of the order. Thus, a spread trading tool may no longer manage a legged child hedge order.

A synthetic spread order may be created as a single entity or tradeable object. As described, a synthetic spread order may be created according to an identified quantity and price for the synthetic spread order. For example, using the spread window 700, the trader may enter an order for a synthetic spread by selecting an area associated with a price level of the price column 718. As a result, a parent order for each lot of the synthetic spread order is created. In addition, child orders for each parent are generated and submitted in legs of the synthetic spread according to at least user preferences and settings for the synthetic spread. Child hedge orders may be created and held until they are sent in response to fills or execution of other child orders.

A synthetic spread may be deleted and/or cancelled as a single entity or tradeable object. After the synthetic order has been entered and the child orders associated with the synthetic order have not been filled or executed, the synthetic order may be deleted, cancelled, placed on a hold, or otherwise prevented from being executed. Deletion may be effected using a spread trading tool, such as Autospreader, that launched the synthetic spread or otherwise submitted its child orders. Deleting a synthetic spread order may delete all managed components of the synthetic spread. In addition, deleting a synthetic spread order may delete all unmanaged components of the synthetic spread.

Accordingly, a trader may determine whether to delete unmanaged orders of a synthetic spread order when that synthetic spread order is deleted. For example, a Delete button on the window display 700 may be selected to delete all, some, or designated synthetic orders. When deleted, the working child quoting orders are deleted, and hedge orders are not sent.

An order for a synthetic spread also may be adjusted after the synthetic order and its constituent child orders have been filled. That is, a price of a working, pending and/or legged parent order may be changed. A price change to a synthetic spread may be effected using a spread trading tool, such as Autospreader, that launched the synthetic spread or otherwise submitted its child orders. When a synthetic order has been adjusted after being submitted, such as when a price of the synthetic order is changed, a price for one or more of the constituent child orders may be adjusted to reflect the price of the adjusted synthetic spread order according to the relationship between the parent orders and the child orders of the spread, a definition of the spread, and/or user preferences/settings. A price for working parent orders may be adjusted to reflect a price change for the synthetic spread. Quoting orders associated with one or more pending or legged parent orders may be submitted for execution at the price level for child quoting orders for working re-priced spread orders.

A quantity for a working parent order also may be affected. The quantity may be changed according to a selection of a revised quantity using the spread trading tool, such as Autospreader, that launched the synthetic spread or otherwise submitted its child orders. The quantity may be changed within a range of values, including changing a quantity of an order to zero. Limits on the quantity may be determined according to one or more factors, including user preferences/settings, limits set for by an exchange, clearinghouse, or other third-party and/or limits set by a regulating body. Where a quantity of the synthetic spread order is adjusted after it is entered, a quantity for one of more of the constituent child orders may also be adjusted according to the according to the relationship between the parent orders and the child orders of the spread, a definition of the spread and/or settings. Quantities of working orders may be adjusted, whereas, quantities of legged or pending orders may not be adjusted in response to adjusted a quantity for the synthetic spread order. When a quantity is adjusted, a risk analysis performed for the adjusted order may be performed to determine a new risk position. For example, where a quantity is reduced, a risk reserve on held child hedge orders may also be reduced accordingly.

The child orders may also be changed or updated with tools other than the spread trading tool that launched the synthetic spread. For example, when a synthetic spread is launched, child quoting orders are submitted in one or more legs of the spread. The managed child quoting orders may be changed in a window display, such as an MD_Trader window display or other application, for the corresponding leg of the spread, while the child quoting order is being managed. The child quoting order may be changed with other tools for managing orders, such as an order book tool. In addition, child quoting orders may be deleted, or adjusted with other tools.

Changes or deletion to a child hedge order may result in all managed and unmanaged components of a synthetic spread order being deleted. Alternatively or in addition, the synthetic spread associated with the child hedge that was changed or deleted may remain legged. When a price change occurs for a child quoting order to a new price level, such as through a window display for the tradeable object or an order book, the child quoting order may be set to the new price level. The tool that launched the synthetic spread order may adjust a target price for associated hedge orders to obtain the spread, or may submit associated hedge orders at or around the original target prices. In addition, other managed orders may not be affected.

When a quantity change to a managed child quoting order occurs, such as through a window display for the tradeable object or an order book, the child quoting order may be pulled or otherwise removed as a managed order. All other quoting orders may also be removed, depending on user preferences/settings. Legged parent orders may also be removed according preferences selected by the user. When a child quoting order is deleted, a synthetic spread may remain if it is still possible to fill the synthetic spread. Otherwise, the synthetic spread order may also be removed.

An unmanaged child order may also be changed or altered with tools other than the spread trading tool that launched the synthetic spread. For example, a price of an unmanaged child order may be changed using a window display for a tradeable object corresponding to the leg of the spread in which the unmanaged child order exists or other tools such as an order book tool. When the price change of an unmanaged child order occurs, the synthetic spread from which the unmanaged child order originated may remain active and may be completed. However, the original price of that synthetic spread may be affected by the price change to the unmanaged child order when it is filled.

In an exemplary embodiment, the quantity of an unmanaged child order is changed according to a selection of a revised quantity using a window display, such as an X_TRADER window. The quantity of the unmanaged child order may be changed within a range of values, including changing a quantity of an order to zero. Limits may be determined according to one or more factors, including user preferences/settings, limits set for by an exchange, clearinghouse, or other third-party and/or limits set by a regulating body. When an unmanaged child order, such as a legged hedge order is changed, the synthetic spread from which the unmanaged child order originated may remain.

Where the quantity of the unmanaged child order is increased, the original quantity may be used in the determination of the state and counts of the synthetic spread order. For example, where a one-lot synthetic order at a 3:2 ratio has been placed and the three orders in the first leg have been filled and the two orders in the second leg (hedge orders) get legged, the count for the legged parent is 1 ($SO_L=1$). If the quantity on the legged child order is increased from 2 to 3, and one of the 3 gets filled, the count for the legged parent may remain 1 ($SO_L=1$). The parent order will be considered filled when one of the two remaining orders is filled. At this point, the remaining order may continue to work, or may be removed.

The quantity of an unmanaged child order also may be decreased. In that event, a parent order may be considered permanently legged. For example, where the unmanaged order is decreased, and the remaining hedge order is filled, the synthetic spread order cannot be filled since there is no remaining quantity to fill the synthetic spread. Similarly, when an unmanaged child order is deleted, the synthetic spread is deleted, the synthetic may also be considered permanently deleted since the child orders cannot be filled. In the event where a synthetic spread order is considered permanently legged, the synthetic spread may be manually or automatically removed or deleted.

A position or risk for a trader or group of traders may be determined according a synthetic spread position, including positions for child quoting orders and child hedge orders of the synthetic spread. That is, by managing the synthetic spread order with its constituent child orders as an integrated order, an accurate position for the trader may be determined before an order for the synthetic spread is submitted for execution.

For example, when a synthetic spread order is created, the quoting orders may be submitted for execution, and hedge orders created or held until execution of one or more of the child quoting orders. Before the child quoting orders are submitted for execution, a risk check may be made considering the child quoting order and child hedge orders. If within acceptable or approved limits, the orders may be submitted. After an order is submitted, and one or more child orders have been filled, the position or risk analysis may be analyzed again to reflect any changes. In addition, position or risk analysis may be analyzed with changes to the managed and/or unmanaged orders. A description of a spread configuration window is provided in U.S. patent application Ser. No. 12/410,210, titled "System and Method for a Risk Check," filed on Mar. 24, 2009, which is incorporated by reference herein in its entirety.

Through management of the child orders of a synthetic spread, a targeted price for the synthetic spread may be achieved. For example, a synthetic spread may be launched at the targeted price for the synthetic spread. As a result, at least one child quoting order is submitted to be executed, and at least one child hedge order associated with the at least one child quoting order, and/or created and held pending execution of the at least one child quoting order.

In an example where a child quoting order is submitted in multiple legs for a parent child order of the synthetic spread, price distortions due to execution of child quoting orders in multiple legs may arise. That is, a targeted price of the synthetic spread may not achieved because multiple child quoting orders were executed where the synthetic spread is defined to have only a child quoting order executed in only one leg. The price distortion may be minimized or eliminated by managing the child quoting orders as a constituent of the synthetic spread order and/or parent order. In the parent-child relationship child orders and parent orders are associated, and child quoting orders may be cancelled in response to execution of a child quoting order in another leg of the synthetic spread order is executed. In an example where a synthetic spread has three legs A, B, and C, and child quoting orders are submitted and simultaneously working each of the three legs, execution of a child quoting order in one leg (Leg B) may trigger cancelation of child quoting order in the other legs (Legs A and C). Accordingly, a true price for the synthetic spread order may be obtained or attempted to be achieved.

In addition, the child quoting orders and child hedge orders may be associated so that, in the event that a child quoting order may be deleted before it is executed, the targeted spread price and quantity may be achieved by managing other child quoting orders and their associated child hedge orders. In the event that multiple child quoting orders are executed prior to at least one child quoting order being deleted, an over fill of the synthetic spread may be possible. The overfilled synthetic spread order may be considered a double-fill, triple-fill or the like. That is, a quantity of the synthetic spread order may be more than a target quantity for the synthetic spread order because at least one of the child quoting orders was not deleted before it was executed. However, in the event that one or more of the filled quoting orders is only partially filled, the order for the synthetic spread may not be overfilled.

In the event of multiple fills, a new parent order for each additional fill may be created to track and manage the additional filled order. As a result, a number of working orders, filled orders and pending orders may be increased. However, to match the original quantity of the synthetic spread order, the number of working orders may be reduced by managing the child quoting orders and child hedge orders within the original quantity of the synthetic spread order.

The order also may be managed to automatically unwind a synthetic spread. In exemplary embodiment of a synthetic spread in a pending state or having at least one parent order pending, the filled child orders of the synthetic spread may be unwound or reversed and the synthetic spread order discontinued. That is, a user may select an unwind function, such as by choosing a button on the spread tool window, the order book tool or the like to unwind the synthetic spread order.

A user also may establish a setting or preference to have a position unwound in response to a trigger. The trigger may be an amount of time that for an order, a price for order, a quantity for an order, or the like. When triggered, the synthetic spread order and its constituent child orders may be managed to unwind the synthetic spread order. Additionally or alternatively, when triggered, multiple options for unwinding the synthetic spread may be provided to the user. In an example, the amount of time that a pending synthetic spread order exists is recorded. When the amount of time exceeds a threshold set by the user, the synthetic spread order may be automatically unwound by creating and submitting correcting child orders to reverse the pending synthetic spread order. In addition or alternatively, when the amount of time exceeds the threshold, options with an associated estimated cost for each option may be presented. The user may select among the options to have the synthetic spread unwound.

A pending synthetic spread may be unwound by deleting working child orders of the pending synthetic spread and submitting constituent correcting child orders to reverse open positions of the synthetic spread, such that once the correcting child orders are filled, a positioned created by the pending spread is neutralized. That is, a tradeout of the position of the pending spread that was produced up to the point that the pending spread was unwound occurs. An unwind order and constituent correcting child orders may be managed as a synthetic spread order as discussed. The unwind order and correcting child orders may have a price and quantities to flatten or neutralize the open positions of the synthetic spread. In addition, a synthetic spread order may have several types of unwind orders and/or correcting child orders to unwind the synthetic spread order.

For example, a pending synthetic spread order may be unwound by submitting correcting child orders that join the market and/or crossing the spread market. That is, the synthetic spread may be unwound by sending a correcting child order in each leg of a synthetic spread that has been filled to flatten or neutralize the position of the filled order in that leg. The correcting child orders may be submitted at an inside market to be executed. Any quoting and child hedge orders of the synthetic spread are cancelled and after execution of the correcting child orders, the synthetic spread may be deemed reversed because of the correcting child order.

A pending synthetic spread also may be unwound by submitting an unwind order to cross the market for the spread. The unwind order may include child orders for each leg of the synthetic spread having at least one child order that was executed. The child orders of the unwind order will each have a quantity that neutralizes or flattens the child orders in the corresponding leg. In addition, the child order of the unwind order will have a price at the inside market for the leg so that the child orders of the unwind order are executed upon submission, or substantially upon submission for execution. When the child orders of the unwind order are submitted, remaining child orders of the synthetic spread to be unwound may be cancelled, so that execution of the unwind order will result in reversal of the synthetic spread order.

Multiple options for unwinding a synthetic spread may be presented. The options may be presented automatically, in response to a user selection, and/or automatically in response to a trigger as discussed. The options may include information for costs for each option presented. The costs may be for example a profit or loss associated with the option. The option also may be selectable. By selecting the option, one or more associated functions for carrying out the option may be performed. The options may include unwinding the spread by joining the market, by crossing the spread market, and/or trading out of each leg. The options may further include continuing to work the synthetic spread. In addition, an option for unwinding by joining the market may have sub-options for joining the market in each appropriate leg that would unwind the synthetic spread. By providing the options and associated costs, a user may identify a desirable option. The user may therefore select an option, and the synthetic spread therefore unwound.

Pending orders that may have been deleted also may be resurrected, automatically, manually or by a combination of automatically and manually. Deletion of pending orders may have been intentional or unintentional. For example, pending order may be deleted as a result of a thin market, a system, gateway, server or PC going down or being interrupted, an incorrect entry, other error conditions and the like. To resurrect a pending order, deleted pending orders that may be resurrected may be presented and selected. In addition, a deleted pending order may be selected to be unwound as described or recreated as originally established. A button, a drop down menu or similar other feature may be presented to a user to select the resurrection feature and/or deleted pending orders that may be resurrected.

A synthetic spread may also be managed to bracket a legged synthetic spread order. The bracket for a synthetic spread order may be established to manage a legged synthetic spread order to mitigate a loss associated with a spread order and/or to cover a gain associated with a legged order. Bracketing for a legged synthetic spread order may be identified or established according to user preferences. FIG. 13 illustrates an example of a spread configuration window 1300. The spread configuration window 1300 may be used to establish or set parameters of a synthetic spread and/or for managing a synthetic spread and its constituent parent and child orders. The spread window 1300 may be selected to set the parameters. The parameters include inside and outside slop configuration, pricing choices, the of the spread, customer account, which legs to quote, adjustments and offset, payup ticks, ratio for the synthetic spread, whether to cancel/replace of change an order, whether to check a price, a cover or upper bracket for a legged order, a lower or order-cancel-order bracket for a legged spread order, parameters for unwinding a synthetic spread order and the like. The type and number of parameters to be established may vary. The parameter may be set by entering a desired setting in a corresponding data entry area for the spread and/or leg of the spread, by selecting one or more options from a drop down menu, by selecting from a choice or radio buttons or the like. A description of a spread configuration window is provided in U.S. Pat. No. 7,437,325, titled "System and Method for Performing Automatic Spread Trading," which is incorporated by reference herein in its entirety.

The spread window configuration 1300 includes a cover bracket setting 1302 to set an upper bracket for a legged order and an OCO setting 1304. The cover bracket and OCO bracket maybe set for one, multiple or all legs of the synthetic spread order. The cover bracket and OCO bracket maybe set by entering a targeted bracket. The targeted bracket may be based on a number of ticks away from an entered order, a percentage of the entered order, a price, a desired profit, a worst case for a loss, a price limit or the like. The targeted bracket may be the same or different for both legs. In addition, the target bracket may be the same or different between the cover bracket 1302 and the OCO bracket 1304. In an example, a number representing a number of ticks is entered in both the cover bracket and the OCO bracket for each leg of the synthetic spread. The spread configuration window 1300 illustrates that the cover bracket 1302 for LEG A is 1 tick, and LEG B is 3 ticks. The OCO bracket 1304 for LEG A is 2 ticks, and LEG B is 4 ticks.

With the bracket established, an executed leg of a legged spread order may be bracketed. For example, when a leg parent order is detected, bracket orders may be entered in a filled leg to mitigate a loss and cancel the legged parent order and corresponding hedge order, and/or to take a gain and cancel the legged parent order and corresponding hedge order. In an example, a legged parent order may include a filled child order in Leg A, and a pending hedge order in Leg B. In response to identifying the legged parent order, a corresponding cover order may be generated and a corresponding OCO order may be generated according to the bracket parameters for a quantity that will flatten, neutralize or close the filled order. Since an order for Leg A was filled, the cover order at a price determined according to the bracket parameters will be entered or submitted for execution. In addition, the OCO order at a price determined according to the bracket parameters will be submitted for execution. In an example, the bracket order for the cover order is 1 tick and for the OCO order is 2 ticks. Accordingly, the price of the cover order is 1 tick above the price of the filled order, and the price of the OCO order is 2 ticks below the price of the filled order. The cover order, the OCO order and the hedge order for the legged synthetic spread may be associated.

Upon execution of the cover order or the OCO order, other associated bracket orders may be cancelled. Therefore, the legged synthetic spread will be considered unlegged and may be removed from being managed. For example, when the cover order is filled, any corresponding OCO order and hedge order will be cancelled. The cover reverses the pending order. Since the hedge order is cancelled, the synthetic spread also no longer exists as discussed. Similarly, when the OCO order is executed, corresponding cover and hedge orders are cancelled, and the synthetic spread no longer exists as discussed.

In an embodiment, bracket orders may be entered after a predetermined time when a legged order is detected. For example, one or more bracket orders may be entered after a first amount of time after the legged order is detected. In addition, a second bracket order may be entered after a second amount of time. The amount of time, may be any increment set by the user.

In an embodiment, bracket orders may be entered based on an amount of movement after a legged order is detected. For example, one or more bracket orders may be entered after the market for the leg has moved a predetermined number of tick. The predetermined number of ticks can be set or adjusted by the user. In addition, a second bracket order may be entered after movement of the same number of ticks or additional number of ticks.

In an embodiment, the bracket order may be entered based on a predetermined amount of time and based on market movement or number of ticks. One skilled in the art will recognize that other bracket orders or types of orders are also possible and within the scope of the invention.

It will be apparent to those of ordinary skill in the art that methods involved in the system and methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A non-transitory computer readable medium having stored therein instructions executable by a processor, including instructions executable to:
   receive, via a data receiver of an electronic computing device, market data identifying an inside market for a first tradeable object and a second tradeable object;
   receive, via a graphical user interface of the electronic computing device, a user request to trade a synthetic spread order for a quantity of a synthetic spread, the synthetic spread including a quoting leg for a first tradeable object and a hedge leg for a second tradeable object;
   submit, in response to receiving the user request via the graphical user interface, via the electronic computing device to an electronic exchange, a quoting order for the first tradeable object;
   submit, in response to receiving at the electronic computing device confirmation of a fill of at least part of the quoting order, via the electronic computing device to the electronic exchange, a hedge order for the second tradeable object;
   determine, via the electronic computing device, whether the synthetic spread order has a filled leg and an unfilled leg, where the hedge order is unfilled and the quoting order is filled;
   determine, via the electronic computing device, whether the inside market for the first tradeable object has moved a predetermined amount according to monitoring the market data for the inside market for the first tradeable object;
   submit, in response to determining that the inside market has moved the predetermined amount and that the synthetic spread order has the filled leg and the unfilled leg, via the electronic computing device to the electronic exchange, a bracket order for the first tradeable object; and
   display, via the graphical user interface, an order descriptor representing a status of the synthetic spread order.

2. The non-transitory computer readable medium of claim 1 where the unfilled leg comprises at least one child hedge order for the first tradeable object.

3. The non-transitory computer readable medium of claim 2 where the at least one child hedge order comprises at least a partial quantity pending execution at an electronic exchange.

4. The non-transitory computer readable medium of claim 3 further comprising instructions executable to submit an order message to the electronic exchange in response to execution of the bracket order, where the order message is configured to cancel the at least one child hedge order.

5. The non-transitory computer readable medium of claim 1 where the bracket order comprises any one of a cover order and an order-cancels-order.

6. The non-transitory computer readable medium of claim 1 where a price for the bracket order is determined according to a position associated with the filled leg.

7. The non-transitory computer readable medium of claim 6 where the position associated with the filled leg is an open position.

8. The non-transitory computer readable medium of claim 6 further comprising instructions executable to determine the price according to a user request.

9. The non-transitory computer readable medium of claim 1 further comprising instructions executable to submit the bracket order in response to determining that the inside market has moved a predetermined amount after identifying the synthetic spread order.

10. The non-transitory computer readable medium of claim 1 further comprising instructions executable to determine that the inside market has moved the predetermined amount and submit the bracket order according to a defined parent-child relationship for the synthetic spread order.

11. The non-transitory computer readable medium of claim 1 further comprising instructions executable to submit the bracket order at a predetermined amount of time after determining that the synthetic spread order includes the filled leg and the unfilled leg.

\* \* \* \* \*